United States Patent
Xiong et al.

(10) Patent No.: US 12,457,592 B2
(45) Date of Patent: Oct. 28, 2025

(54) TECHNIQUES FOR DOWNLINK AND UPLINK RESOURCE MAPPING FOR FULL DUPLEX AND NON-CELL DEFINING SYNCHRONIZATION SIGNAL BLOCK

(71) Applicant: Intel Corporation, Santa Clara, CA (US)

(72) Inventors: Gang Xiong, Portland, OR (US); Debdeep Chatterjee, San Jose, CA (US); Yingyang Li, Beijing (CN); Yi Wang, Beijing (CN); Sergey Panteleev, Kildare (IE); Salvatore Talarico, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 18/185,145

(22) Filed: Mar. 16, 2023

(65) Prior Publication Data
US 2023/0224880 A1    Jul. 13, 2023

Related U.S. Application Data

(60) Provisional application No. 63/411,001, filed on Sep. 28, 2022, provisional application No. 63/350,740, filed on Jun. 9, 2022, provisional application No. 63/321,381, filed on Mar. 18, 2022, provisional application No. 63/320,852, filed on Mar. 17, 2022.

(51) Int. Cl.
*H04W 72/04* (2023.01)
*H04L 5/14* (2006.01)
*H04W 72/0453* (2023.01)
*H04W 72/23* (2023.01)
*H04W 74/0833* (2024.01)
*H04W 74/0836* (2024.01)

(52) U.S. Cl.
CPC .......... *H04W 72/0453* (2013.01); *H04L 5/14* (2013.01); *H04W 72/23* (2023.01); *H04W 74/0833* (2013.01); *H04W 74/0836* (2024.01)

(58) Field of Classification Search
CPC ...... H04W 72/0453; H04W 72/23; H04L 5/14
See application file for complete search history.

(56) References Cited

U.S. PATENT DOCUMENTS

2025/0184050 A1*  6/2025  Wang .................... H04W 72/23

OTHER PUBLICATIONS

3GPP, "3rd Generation Partnership Project; Technical Specification Group Radio Access Network; NR; Physical channels and modulation (Release 17)", Dec. 2021, 134 pages, TS 38.211 V17.0.0.

(Continued)

*Primary Examiner* — Sulaiman Nooristany
(74) *Attorney, Agent, or Firm* — Schwegman Lundberg & Woessner, P.A.

(57) ABSTRACT

Various embodiments herein provide techniques for downlink and uplink resource mapping for full duplex communication, e.g., non-overlapping sub-band-full duplex (NOSB-FD) communication that includes a frequency resource for uplink communication and a frequency resource for downlink communication. Also described are techniques for user equipment (UE) behavior associated with a non-cell defining synchronization signal block (NCD-SSB). Other embodiments may be described and claimed.

10 Claims, 11 Drawing Sheets

(56) References Cited

OTHER PUBLICATIONS

3GPP, "3rd Generation Partnership Project; Technical Specification Group Radio Access Network; NR; Radio Resource Control (RRC) protocol specification (Release 16)", Dec. 2021, 963 pages, TS 38.331 V16.7.0.

3GPP, "3rd Generation Partnership Project; Technical Specification Group Radio Access Network; NR; Physical layer procedures for control (Release 16)", Dec. 2021, 189 pages, TS 38.213 V16.8.0.

* cited by examiner

TECHNIQUES FOR DOWNLINK AND UPLINK RESOURCE MAPPING FOR FULL DUPLEX AND NON-CELL DEFINING SYNCHRONIZATION SIGNAL BLOCK

CROSS REFERENCE TO RELATED APPLICATION

The present application claims priority to U.S. Provisional Patent Application No. 63/320,852, which was filed Mar. 17, 2022; U.S. Provisional Patent Application No. 63/321,381, which was filed Mar. 18, 2022; U.S. Provisional Patent Application No. 63/350,740, which was filed Jun. 9, 2022; and U.S. Provisional Patent Application No. 63/411,001, which was filed Sep. 28, 2022; the disclosures of which are hereby incorporated by reference.

FIELD

Various embodiments generally may relate to the field of wireless communications. For example, some embodiments may relate to techniques for downlink and uplink resource mapping for full duplex communication and/or non-cell defining synchronization signal block.

BACKGROUND

Various embodiments generally may relate to the field of wireless communications. A cell in a wireless cellular network may transmit a synchronization signal block (SSB). The SSB may be a cell-defining SSB (CD-SSB) or a non-cell-defining SSB (NCD-SSB). A CD-SSB is a SSB that the user equipment (UE) uses to obtain the physical cell ID and system information block 1 (SIB1). On the other hand, a NCD-SSB is used when the UE already has access to the cell, so it is not used to obtain the physical cell ID and SIB1.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for downlink and uplink resource mapping for full duplex communication, e.g., non-overlapping sub-band-full duplex (NOSB-FD) communication. Embodiments further provide techniques for user equipment (UE) behavior associated with a non-cell defining synchronization signal block (NCD-SSB).

UE Behavior for Non-Cell Defining Synchronization Signal Block

In 5G NR, a class of Reduced Capability (RedCap) NR UEs is defined with complexity and power consumption levels lower than Rel-15 NR UEs, catering to use cases like industrial wireless sensor networks (IWSN), certain class of wearables, and video surveillance, to fill the gap between current LPWA solutions and eMBB solutions in NR and also to further facilitate a smooth migration from 3.5G and 4G technologies to 5G (NR) technology for currently deployed bands serving relevant use cases requiring relatively low-to-moderate reference (e.g., median) and peak user throughputs, low device complexity, small device form factors, and relatively long battery lifetimes.

Figure 1:
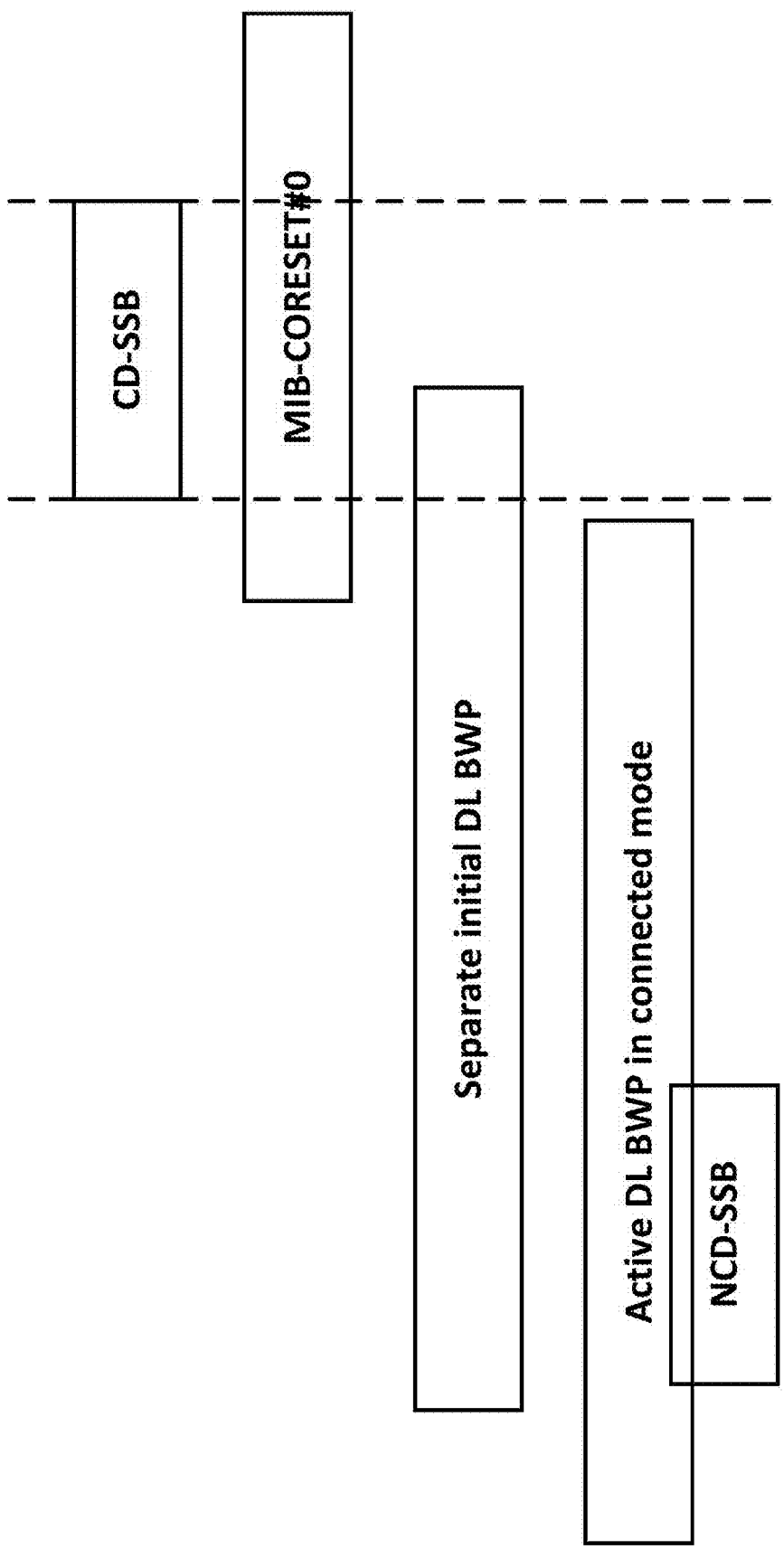
FIG. 1 illustrates an example configuration of a bandwidth part (BWP) and synchronization signal block (SSB) for a reduced capability (RedCap) user equipment (UE), in accordance with various embodiments.

Some of the primary components to UE complexity may include: reduction in the requirements for UE bandwidth (BW), number of receive (Rx) antennas, reduced maximum modulation order, half duplex frequency division multiplexing (HD-FDD), etc. The reduced BW of RedCap UE limits the configuration of initial DL or UL BWP and/or the active DL or UL BWP. FIG. 1 illustrate one example for the configuration of BWP and SSB for RedCap UE. In FIG. 1, a separate initial DL BWP of a RedCap UE may not include a cell-defining SSB (CD-SSB). This is for the case that the initial DL BWP is configured for random access but not for paging. On the other hand, an active DL BWP for a RedCap UE in connected mode, if it does not include a CD-SSB, a non-cell defining SSB (NCD-SSB) can be configured in the DL BWP. A CD-SSB is a SSB the UE uses to obtain the physical cell ID and SIB1. On the other hand, a NCD-SSB is used when the UE already has access to the cell, so it is not used to obtain the physical cell ID and SIB1.

Various embodiments herein provide techniques to handle the collision between uplink transmission and NCD-SSB for a UE in NR. For example, aspects of various embodiments may include one or more of:

Resolving link direction conflicts involving NCD-SSB or CD-SSB

Available slot determination in case of NCD-SSB

Validation of PRACH occasions and PUSCH occasions in case of NCD-SSB

Rate-matching for PDSCH and PDCCH transmission in case of NCD-SSB

Use of NCD-SSB in separate initial DL BWP for BWP #0 configuration option 1

While the embodiments are described herein with reference to a RedCap UE, aspects of various embodiments may be used for non-RedCap (e.g., normal) UEs.

The presence of CD-SSB is configured by the ssb-PositionsInBurst in SIB1 or in ServingCellConfigCommon. The presence of NCD-SSB can be configured by high layer. In one option, NCD-SSB may be configured with same periodicity and same time location in a period as CD-SSB. In another option, the NCD-SSB may be configured with a same or different periodicity from CD-SSB. The NCD-SSB, if present, is in the same time position as CD-SSB. In another option, NCD-SSB may be configured with same periodicity as CD-SSB but with an offset to the time location of CD-SSB. The time location of NCD-SSB in a period is same as CD-SSB except the offset. In another option, the NCD-SSB may be configured with a same or different periodicity from CD-SSB and an offset to the time location of CD-SSB. The time location of NCD-SSB, if present, is same as CD-SSB except the offset. The presence of NCD-SSB may share the configuration of ssb-PositionsInBurst in SIB1 or in ServingCellConfigCommon. NCD-SSB may be 'QCL'-ed with CD-SSB when the NCD-SSB and CD-SSB share the same SSB index. Specifically, the NCD-SSB can be configured by NonCellDefiningSSB.

For a RedCap UE, it may share the initial DL BWP with non-RedCap UE if the initial DL BWP is no more than the maximum DL bandwidth supported by RedCap UE. In this case, there is CD-SSB in the initial DL BWP.

A separate initial DL BWP configured for RedCap UE may include the CD-SSB. On the other hand, UE does not expect a separate initial DL BWP configured for RedCap UE include any SSB if it is configured for random access while not for paging in idle/inactive mode. Further, a separate initial DL BWP in connected mode, if it does not include CD-SSB and the entire CORESET #0 and if it is configured for paging, a RedCap UE supporting mandatory feature group (FG) 6-1 (but not optional FG 6-1a) expects it to contain NCD-SSB. Optionally, a RedCap UE supporting FG 6-1a does not expect it to contain any SSB.

Further, an RRC-configured active DL BWP in connected mode may include the CD-SSB. On the other hand, for an RRC-configured active DL BWP in connected mode, if it does not include CD-SSB and the entire CORESET #0, a RedCap UE supporting mandatory FG 6-1 (but not optional FG 6-1a) expects it to contain NCD-SSB. Optionally, if a UE indicates the capability that NCD-SSB is not needed, an RRC-configured active DL BWP in connected mode may not include any SSB.

Resolving Link Direction Conflicts Involving NCD-SSB or CD-SSB

In the following embodiments, the collision between a UL transmission and a CD-SSB or NCD-SSB includes 1) the UL transmission is overlapped with the CD-SSB or NCD-SSB in at least one symbol, and/or 2) the UL transmission is not overlapped with the CD-SSB or NCD-SSB, but there is no sufficient Tx-Rx or Rx-Tx switching gap for UE between the UL transmission and the CD-SSB or NCD-SSB.

In one embodiment, when NCD-SSB is present in an RRC-configured active DL BWP, if a semi-statically configured or dynamically scheduled UL transmission is collided with a NCD-SSB, the NCD-SSB is prioritized and the UL transmission is canceled. The semi-statically configured UL transmission include PUSCH, or PUCCH, or SRS. The dynamically scheduled UL transmission include a PRACH based on a detected DCI format, or PUSCH, or PUCCH, or SRS.

In one option, if a HD-UE would transmit a PUSCH, or PUCCH, or SRS based on a configuration by higher layers and the HD-UE is indicated presence of CD-SSBs and/or NCD-SSBs, the HD-UE does not transmit PUSCH or PUCCH if a last symbol of the PUSCH or PUCCH transmission would not be at least $N_{Tx-Rx} \cdot T_c$, [4, TS 38.211] prior to a first symbol of the next earliest CD-SSB or NCD-SSB PUSCH or PUCCH if a first symbol of the PUSCH or PUCCH transmission would not be at least $N_{Rx-Tx} \cdot T_c$, [4, TS 38.211] after a last symbol of the previous latest CD-SSB or NCD-SSB SRS in symbols that would not be at least $N_{Tx-Rx} \cdot T_c$ prior to a first symbol of the next earliest CD-SSB or NCD-SSB SRS in symbols that would not be at least $N_{Rx-Tx} \cdot T_c$ after a last symbol of the previous latest CD-SSB or NCD-SSB In another option, if a HD-UE would transmit a PRACH based on a detected DCI format, or PUSCH, or PUCCH, or SRS and the HD-UE is indicated presence of CD-SSBs and/or NCD-SSBs in a set of symbols, the HD-UE does not transmit PUSCH or PUCCH or PRACH if a transmission would overlap with any symbol from the set of symbols and the HD-UE does not transmit SRS in the set of symbols.

In another option, for operation on a single carrier in unpaired spectrum, for a set of symbols of a slot indicated to a UE for reception of CD-SSBs and/or NCD-SSBs, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by tdd-UL-DL-ConfigurationCommon, or tdd-UL-DL-Configuration-Dedicated, when provided to the UE.

In one embodiment, when NCD-SSB is present in an RRC-configured active DL BWP, if a valid RO or valid MsgA PUSCH triggered by higher layers is collided with an NCD-SSB, it is up to UE implementation whether to receive NCD-SSB or transmit PRACH.

In one option, if a HD-UE would transmit a PRACH or MsgA PUSCH triggered by higher layers in a set of symbols and is indicated presence of CD-SSBs and/or NCD-SSBs in symbols that include any symbol from the set of symbols, the HD-UE can select based on its implementation whether to either transmit the PRACH or the MsgA PUSCH or receive the CD-SSBs and/or NCD-SSBs.

In another option, if a HD-UE is indicated presence of CD-SSBs and/or NCD-SSBs in a set of symbols, and the HD-UE would transmit PRACH or MsgA PUSCH triggered by higher layers starting or ending at a symbol that is earlier or later than $N_{Rx-Tx} \cdot T_c$, or $N_{Tx-Rx} \cdot T_c$, respectively, from the last or first symbol in the set of symbols, the HD-UE can select based on its implementation whether to either transmit the PRACH or the MsgA PUSCH or receive the CD-SSBs and/or NCD-SSBs.

It should be noted that although the above embodiments and examples for handling of time-domain overlaps between one or more symbol(s) in which NCD-SSB is configured and those with UL transmissions are described for RRC-configured active DL BWP, they can also be applied to separate initial DL BWP in RRC idle/inactive states, or to separate initial DL BWP in RRC connected state for BWP #0 configuration option 1 as defined in [3GPP TS 38.331, Appendix B.2], if the separate initial DL BWP may be associated with (e.g., include) an NCD-SSB.

In one embodiment, for a FDD UE, when SSB is not present in a separate initial DL BWP or RRC-configured active DL BWP, the transmission of a semi-statically configured or dynamically scheduled UL transmission can be transmitted, irrespective of the presence of a CD-SSB or NCD-SSB that is not configured in the separate initial DL BWP or RRC-configured active DL BWP.

In one option, for a FDD UE, when SSB is not present in a separate initial DL BWP or RRC-configured active DL BWP, the transmission of a semi-statically configured or dynamically scheduled UL transmission can be transmitted, irrespective of the presence of a CD-SSB or NCD-SSB that is configured in a BWP other than the separate initial DL BWP or RRC-configured active DL BWP.

In one option, a HD-UE, configured with Type 1 PDCCH-CSS for random access in a separate initial DL BWP which does not include a CD-SSB, may perform measurement on the CD-SSB, paging or system information reception in the frequency of CORESET #0 indicated by the MIB, and the UL transmission on the separate initial UL BWP may not be affected by the configured CD-SSBs associated with CORESET #0.

In one embodiment, when SSB is not present in a separate initial DL BWP or RRC-configured active DL BWP, if a semi-statically configured or dynamically scheduled UL transmission is collided with a CD-SSB that is not configured in the separate initial DL BWP or RRC-configured active DL BWP, the UL transmission is canceled. The semi-statically configured UL transmission include PUSCH, or PUCCH, or SRS. The dynamically scheduled UL transmission include a PRACH based on a detected DCI format, or PUSCH, or PUCCH, or SRS.

In one option, a HD-UE, in a separate initial DL BWP or RRC-configured active DL BWP which does not include a CD-SSB, if a semi-statically configured or dynamically scheduled UL transmission is collided with a CD-SSB that is not configured in the separate initial DL BWP or RRC-configured active DL BWP, the UL transmission is canceled.

In another option, a HD-UE, configured with Type 1 PDCCH-CSS for random access in a separate initial DL BWP which does not include a CD-SSB, if a semi-statically configured or dynamically scheduled UL transmission is collided with a CD-SSB, the UL transmission is canceled, where the UL transmission may be one of: a PRACH transmission, a PUSCH carrying Msg3 transmission/retransmission, a PUSCH that is part of Msg A, or a PUCCH with HARQ-ACK in response to PDSCH with Msg4.

In another option, in unpaired spectrum, a RedCap UE may be expected to cancel an UL transmission if the UL transmission overlaps with a CD-SSB, irrespective of whether the CD-SSB is included within the separate initial DL BWP or not, where the UL transmission include any semi-statically configured or dynamically scheduled UL transmission.

In another option, in unpaired spectrum, a RedCap UE, configured with Type 1 PDCCH-CSS for random access in separate initial DL BWP which does not include a CD-SSB, may be expected to cancel an UL transmission if the UL transmission overlaps with a CD-SSB, irrespective of whether the CD-SSB is included within the separate initial DL BWP or not, where the UL transmission may be one of: a PRACH transmission, a PUSCH carrying Msg3 transmission/retransmission, a PUSCH that is part of Msg A, or a PUCCH with HARQ-ACK in response to PDSCH with Msg4.

In another option, in unpaired spectrum, a RedCap UE, configured with Type 1 PDCCH-CSS for random access in separate initial DL BWP which does not include a CD-SSB, may not expect to be scheduled with a PUSCH for Msg3 or a PUCCH with HARQ-ACK in response to Msg4 PDSCH that overlaps in at least one symbol with the CD-SSB, irrespective of whether the CD-SSB is included within the separate initial DL BWP or not.

Available Slot Determination in Case of NCD-SSB

In NR, for PUSCH repetition type A with counting based on available slot, TB processing over multiple slot PUSCH (TBoMS), and PUCCH repetitions, in the first step of available slot determination, tdd-UL-DL-Configuration-Common, tdd-UL-DL-ConfigurationDedicated and ssb-PositionsInBurst are considered for the determination of available slots. In particular, UE determines a slot as available slot when PUSCH repetition does not overlap with semi-statically configured DL symbols and flexible symbols used for synchronization signal block (SSB) transmission. Note that when NCD-SSB is present in an RRC-configured active DL BWP for RedCap UEs, certain mechanism may also need to be considered for the determination of available slots in the first step.

Embodiments of available slot determination in case of NCD-SSB for RedCap UEs are provided as follows. The disclosed solution may also be applicable to a non-RedCap UE, e.g., if it is configured with the NCD-SSB, or the case when NCD-SSB is present in non-active DL BWP.

In one embodiment, when NCD-SSB is present in an RRC-configured active DL BWP, for PUSCH repetition type A with counting based on available slot, and TBoMS for the UEs, in the first step for determination of available slots, a slot is not counted in the number of N·K slots for PUSCH transmission if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block for NCD-SSB and/or CD-SSB. Note that this can apply for the RedCap UEs or non-RedCap UEs in TDD or HD-FDD systems.

Figure 2:
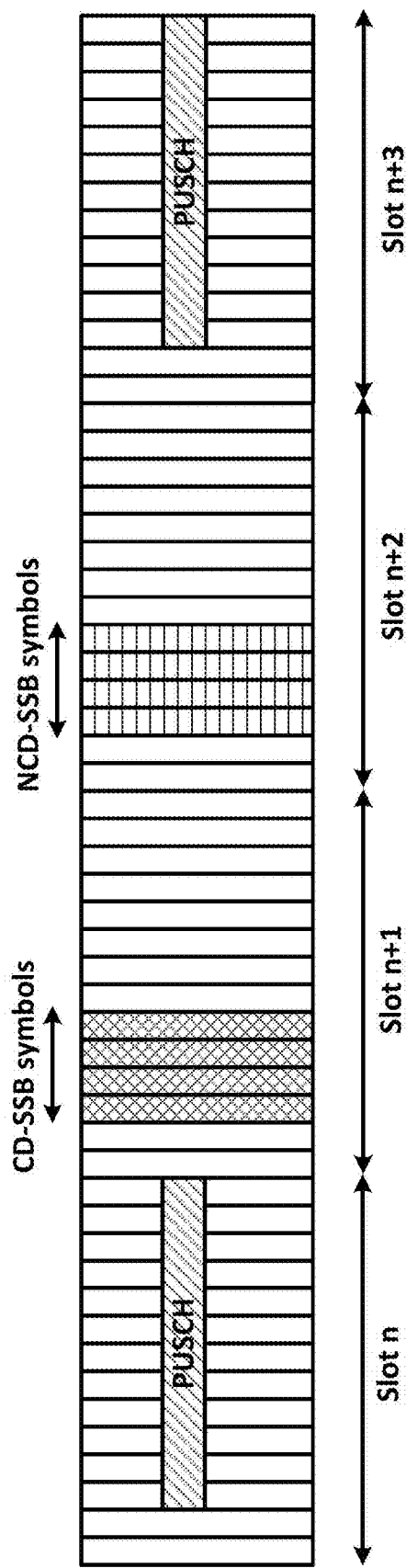
FIG. 2 illustrates an example of available slot determination for physical uplink shared channel (PUSCH) repetition type A and transport block over multiple slots (TBoMS) in case of cell-defining SSB (CD-SSB) and non-cell-defining SSB (NCD-SSB), in accordance with various embodiments.

FIG. 2 illustrates one example of available slot determination for PUSCH repetition type A and TBoMS in case of CD-SSB and NCD-SSB. In the example, 2 repetitions are indicated for PUSCH repetition type A with counting based on available slot. Given that the allocated resource for PUSCH transmission overlaps with the symbols for CD- SSB and NCD-SSB in slot n+1 and slot n+2, these two slots are not considered as available slots for PUSCH repetition type A and TBoMS. In this case, slot n and slot n+3 are considered as available slots and UE may transmit PUSCH repetitions or TBoMS in these two slots.

In another embodiment, when NCD-SSB is present in an RRC-configured active DL BWP, for PUCCH repetitions for the UEs, UE determines a slot available for PUCCH repetition if a repetition of the PUCCH transmission does not include a symbol indicated as downlink by tdd-UL-DL-ConfigurationCommon or tdd-UL-DL-ConfigurationDedicated if provided or indicated as a symbol of an SS/PBCH block for NCD-SSB and/or CD-SSB. Note that this can apply for the RedCap UEs or non-RedCap UEs in TDD or HD-FDD systems.

In another embodiment, when NCD-SSB is present in an RRC-configured active DL BWP, symbols indicated for NCD-SSB transmission are considered as invalid symbols for PUSCH repetition Type B transmission. Note that this can apply for the RedCap UEs or non-RedCap UEs in TDD or HD-FDD systems.

In another embodiment, when NCD-SSB is present in an RRC-configured active DL BWP, for Msg3 PUSCH repetition for the UEs, UE determines an available slot for PUSCH repetition if a repetition of the PUSCH transmission does not include a symbol indicated as downlink by tdd-UL-DL-ConfigurationCommon or indicated as a symbol of an SS/PBCH block for NCD-SSB and/or CD-SSB. Note that this can apply for the RedCap UEs or non-RedCap UEs in TDD or HD-FDD systems.

It should be noted that the above embodiments can also be applied when the DL BWP is a separate initial DL BWP in RRC idle/inactive states or a separate initial DL BWP in RRC connected state for BWP #0 configuration option 1 as defined in [3GPP TS 38.331, Appendix B.2], if the separate initial DL BWP may be associated with (e.g., include) an NCD-SSB.

In another embodiment, when NCD-SSB is present in an RRC-configured active DL BWP, for PUSCH repetition type A with counting based on available slot, and TBoMS for HD-FDD RedCap UEs, in the first step for determination of available slots, a UE determines a slot as an available slot when a PUSCH or TBoMS transmission starts or ends at least $N_{Rx\text{-}Tx} \cdot T_c$, or $N_{Tx\text{-}Rx} \cdot T_c$, respectively, from the last or first symbol in the set of symbols for NCD-SSB and/or CD-SSB and does not overlap with NCD-SSB and/or CD-SSB transmission.

In another embodiment, when NCD-SSB is present in an RRC-configured active DL BWP, for PUCCH repetition for HD-FDD RedCap UEs, in the first step for determination of available slots, a UE determines a slot as an available slot when a PUCCH repetition starts or ends at least $N_{Rx\text{-}Tx} \cdot T_c$, or $N_{Tx\text{-}Rx} \cdot T_c$, respectively, from the last or first symbol in the set of symbols with NCD-SSB and/or CD-SSB and does not overlap with NCD-SSB and/or CD-SSB transmission.

In another embodiment, when NCD-SSB is present in an RRC-configured active DL BWP, the symbols indicated for NCD-SSB and/or CD-SSB are considered as invalid symbols for PUSCH repetition Type B transmission. Note that this may apply for the RedCap UEs or non-RedCap UEs in TDD or HD-FDD systems.

In another embodiment, when NCD-SSB is present in an RRC-configured active DL BWP, for HD-FDD RedCap UEs, symbols that are not at least $N_{Rx\text{-}Tx} \cdot T_c$, before the first symbol or not at least $N_{Rx\text{-}Tx} \cdot T_c$, after the last symbol indicated for a NCD-SSB and/or CD-SSB are considered as invalid symbols for PUSCH repetition Type B transmission. This may apply to PUSCH repetition Type B transmission that is configured by high layer or dynamically scheduled by a PDCCH.

In another embodiment, for HD-FDD RedCap UEs, symbols that are not at least $N_{Rx\text{-}Tx} \cdot T_c$, before the first symbol or not at least $N_{Rx\text{-}Tx} \cdot T_c$, after the last symbol indicated by ssb-PositionsInBurst in SIB1 or ssb-PositionsInBurst in ServingCellConfigCommon for reception of SS/PBCH blocks are considered as invalid symbols for PUSCH repetition Type B transmission. This may apply to PUSCH repetition Type B transmission that is configured by high layer or dynamically scheduled by a PDCCH.

Note that aspects of the embodiments herein may also apply for non-RedCap UEs.

Validation of PRACH Occasions and PUSCH Occasions in Case of NCD-SSB

In NR, the validation rule for physical random access channel (PRACH) occasions, MsgA PUSCH occasions and configurated grant PUSCH (CG-PUSCH) occasion for small data transmission (SDT) is determined based on the CD-SSB. When NCD-SSB is present in an RRC-configured active DL BWP for RedCap UEs or non-RedCap UEs, certain mechanism may also need to be considered for the validation rules.

Embodiments of validation of PRACH occasions and MsgA PUSCH occasions in case of NCD-SSB for RedCap UEs or non-RedCap UEs are provided as follows. Note that this may also be applicable to the case when NCD-SSB is present in a separate initial DL BWP.

In one embodiment, when NCD-SSB is present in an RRC-configured active DL BWP, for RedCap UEs or non-RedCap UEs, for paired spectrum or supplementary uplink band all PRACH occasions are valid. Note: this applies to all FDD UEs.

For unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is provided in Table 8.1-2 in TS38.213 [1] and, if channelAccessMode=semistatic is provided, does not overlap with a set of consecutive symbols before the start of a next channel occupancy time where the UE does not transmit, where SS/PBCH block index of the SS/PBCH block corresponds to the SS/PBCH block index for NCD-SSB and/or CD-SSB.

If a UE is provided tdd-UL-DL-ConfigurationCommon, a PRACH occasion in a PRACH slot is valid if it is within UL symbols, or it does not precede a SS/PBCH block in the PRACH slot and starts at least $N_{gap}$ symbols after a last downlink symbol and at least $N_{gap}$ symbols after a last SS/PBCH block symbol, where $N_{gap}$ is provided in Table 8.1-2 in TS38.213 [1], and if channelAccessMode=semistatic is provided, does not overlap with a set of consecutive symbols before the start of a next channel occupancy time where there shall not be any transmissions, where SS/PBCH block index of the SS/PBCH block corresponds to the SS/PBCH block index for NCD-SSB and/or CD-SSB.

In another embodiment, in case of 2-step RACH for RedCap UEs or non-RedCap UEs, when NCD-SSB is present in an RRC-configured active DL BWP, a MsgA PUSCH occasion is valid if it does not overlap in time and frequency with any valid PRACH occasion associated with either a Type-1 random access procedure or a Type-2 random access procedure.

For unpaired spectrum, if a UE is not provided tdd-UL-DL-ConfigurationCommon, a PUSCH occasion is valid if the PUSCH occasion does not precede a SS/PBCH block in the PUSCH slot, and starts at least $N_{gap}$ symbols after a last SS/PBCH block symbol, where $N_{gap}$ is provided in Table 8.1-2 in TS38.213 [1] and, if channelAccessMode=semistatic is provided, does not overlap with a set of consecutive symbols before the start of a next channel occupancy time where the UE does not transmit, where SS/PBCH block index of the SS/PBCH block corresponds to the SS/PBCH block index for NCD-SSB and/or CD-SSB.

If a UE is provided tdd-UL-DL-ConfigurationCommon, a PUSCH occasion is valid if the PUSCH occasion is within UL symbols, or does not precede a SS/PBCH block in the PUSCH slot, and starts at least $N_{gap}$ symbols after a last downlink symbol and at least $N_{gap}$ symbols after a last SS/PBCH block symbol, where $N_{gap}$ is provided in Table 8.1-2 in TS38.213 [1] and, if channelAccessMode=semistatic is provided, does not overlap with a set of consecutive symbols before the start of a next channel occupancy time where the UE does not transmit, where SS/PBCH block index of the SS/PBCH block corresponds to the SS/PBCH block index for NCD-SSB and/or CD-SSB.

In another embodiment, in case of CG-SDT for RedCap UEs or non-RedCap UEs, when NCD-SSB is present in an RRC-configured active DL BWP, for unpaired spectrum, if a UE is not provided tdd-UL-DL-ConfigurationCommon, a PUSCH occasion is valid if the PUSCH occasion does not precede a SS/PBCH block in the PUSCH slot, and starts at least $N_{gap}$ symbols after a last SS/PBCH block symbol, where $N_{gap}$ is provided in Table 8.1-2 in TS38.213 [1] and SS/PBCH block index of the SS/PBCH block corresponds to the SS/PBCH block index for NCD-SSB and/or CD-SSB.

If a UE is provided tdd-UL-DL-ConfigurationCommon, a PUSCH occasion is valid if the PUSCH occasion is within UL symbols starts at least $N_{gap}$ symbols after a last downlink symbol, and at least $N_{gap}$ symbols after a last SS/PBCH block symbol, where $N_{gap}$ is provided in Table 8.1-2 in TS38.213 [1] and SS/PBCH block index of the SS/PBCH block corresponds to the SS/PBCH block index for NCD-SSB and/or CD-SSB.

It should be noted that the above embodiments can also be applied when the DL BWP is a separate initial DL BWP in RRC idle/inactive states or a separate initial DL BWP in RRC connected state for BWP #0 configuration option 1 as defined in [3GPP TS 38.331, Appendix B.2], if the separate initial DL BWP may be associated with (e.g., include) an NCD-SSB.

Rate-Matching for PDSCH and PDCCH Transmission in Case of NCD-SSB

Embodiments of rate-matching of PDSCH and PDCCH transmission in case of NCD-SSB are provided as follows:

In one embodiment, when NCD-SSB is present in an RRC-configured active DL BWP, for RedCap UEs or non-RedCap UEs, for monitoring of a PDCCH candidate by a UE, if the UE has received ssb-PositionsInBurst for NCD-SSB for a serving cell, and at least one RE for a PDCCH candidate overlaps with at least one RE of a candidate SS/PBCH block corresponding to a SS/PBCH block index provided by ssb-PositionsInBurst for NCD-SSB with same physical cell identity as the one associated with a RS having same quasi-collocation properties as a CORESET for the PDCCH candidate, the UE is not required to monitor the PDCCH candidate.

In another embodiment, when NCD-SSB is present in an RRC-configured active DL BWP, for RedCap UEs or non-RedCap UEs, the UE assumes SS/PBCH block transmission for NCD-SSB and/or CD-SSB if the PDSCH resource allocation overlaps with PRBs containing SS/PBCH block transmission resources, the UE shall assume that the PRBs containing SS/PBCH block transmission resources are not available for PDSCH in the OFDM symbols where SS/PBCH block is transmitted for NCD-SSB and/or CD-SSB.

In another embodiment, a RedCap UE or a non-RedCap UE may be provided with a PDSCH rate-matching pattern such that the corresponding RateMatchPattern may contain within a BWP, a frequency domain resource of a SS/PBCH block and time domain resource of a SS/PBCH block determined according to a higher layer configured parameter ssb-PositionsInBurstForRateMatching, where the parameter ssb-PositionsInBurstForRateMatching has a similar structure and range as ssb-PositionsInBurst for CD-SSB. This resource may not be available for PDSCH. This resource can be included in one or two groups of resource sets (higher layer parameters rateMatchPatternGroup1 and rateMatchPatternGroup2). Such a method can enable spectrally efficient coexistence between NCD-SSB and PDSCHs received by UEs that may not support NCD-SSB or may not be configured for NCD-SSB reception.

Use of NCD-SSB in Separate Initial DL BWP for BWP #0 Configuration Option 1

In an embodiment, for BWP #0 configuration option 1, in RRC connected mode, if a RedCap UE is configured with an RRC-configured DL BWP that is provided with an NCD-SSB configuration such that the NCD-SSB is included within the bandwidth of a separate initial DL BWP, the UE may assume presence of NCD-SSB when the separate initial DL BWP is the active DL BWP. Further, in an example, the UE may also perform measurements using the NCD-SSB when the separate initial DL BWP is the active DL BWP. As one option, the above embodiment and example may only apply when the separate initial DL BWP does not include the CD-SSB.

In another embodiment, for BWP #0 configuration option 1, a RedCap UE may be configured with a separate initial DL BWP that does not include the CD-SSB with Type 1 PDCCH CSS (without Type 2 PDCCH CSS configuration) configured in the separate initial DL BWP, and in this case, the UE may expect to be provided with at least the configuration of an RRC-configured DL BWP in BWP-DownlinkDedicated that includes a configuration of NCD-SSB such that the NCD-SSB is included within the bandwidth of the separate initial DL BWP. Alternatively, or in addition, if the NCD-SSB is not included within the bandwidth of the separate initial DL BWP, then the UE may expect to be switched to the RRC-configured DL BWP upon RRC connection setup.

Downlink and Uplink Resource Mapping for Full Duplex Communication

Time Division Duplex (TDD) may be used in commercial NR deployments. The time domain resource may be split between downlink (DL) and uplink (UL) symbols. Allocation of a limited time duration for the uplink in TDD can result in reduced coverage and increased latency for a given target data rate. To improve the performance for UL in TDD, simultaneous transmission/reception of downlink and uplink respectively, also referred to as "full duplex communication" can be considered. In this regard, the case of Non-Overlapping Sub-Band Full Duplex (NOSB-FD) at the gNB may be considered.

For NOSB-FD, within a carrier bandwidth, some bandwidth can be allocated as UL, while some bandwidth can be allocated as DL within the same symbol, however the UL and DL resources are non-overlapping in frequency domain. Under this operational mode, at a given symbol a gNB can simultaneously transmit DL signals and receive UL signals, while a UE may only transmit or receive at a time.

For a UE not aware of support of NOSB-FD at the gNB, the UE may only identify DL or UL resources in a symbol. For a UE that may be provided with the information of NOSB-FD operations at gNB, the UE may identify both DL and UL resources in a symbol. For such UE, new scheduling restrictions and/or UE behavior may be defined to enable the UE to decide how to transmit UL signals/channels according to the symbol with both DL and UL resources, and how to receive DL signals/channels according to the symbol with both DL and UL resources.

Embodiments herein relate to determination of DL/UL signals/channels mapping and validation for NOSB-FD.

Embodiments may include or relate to one or more of the following:
  Determination of PDCCH/PDSCH/CSI-RS resource mapping.
  Determination of PUSCH/PUCCH/SRS resource mapping.

Figure 3:
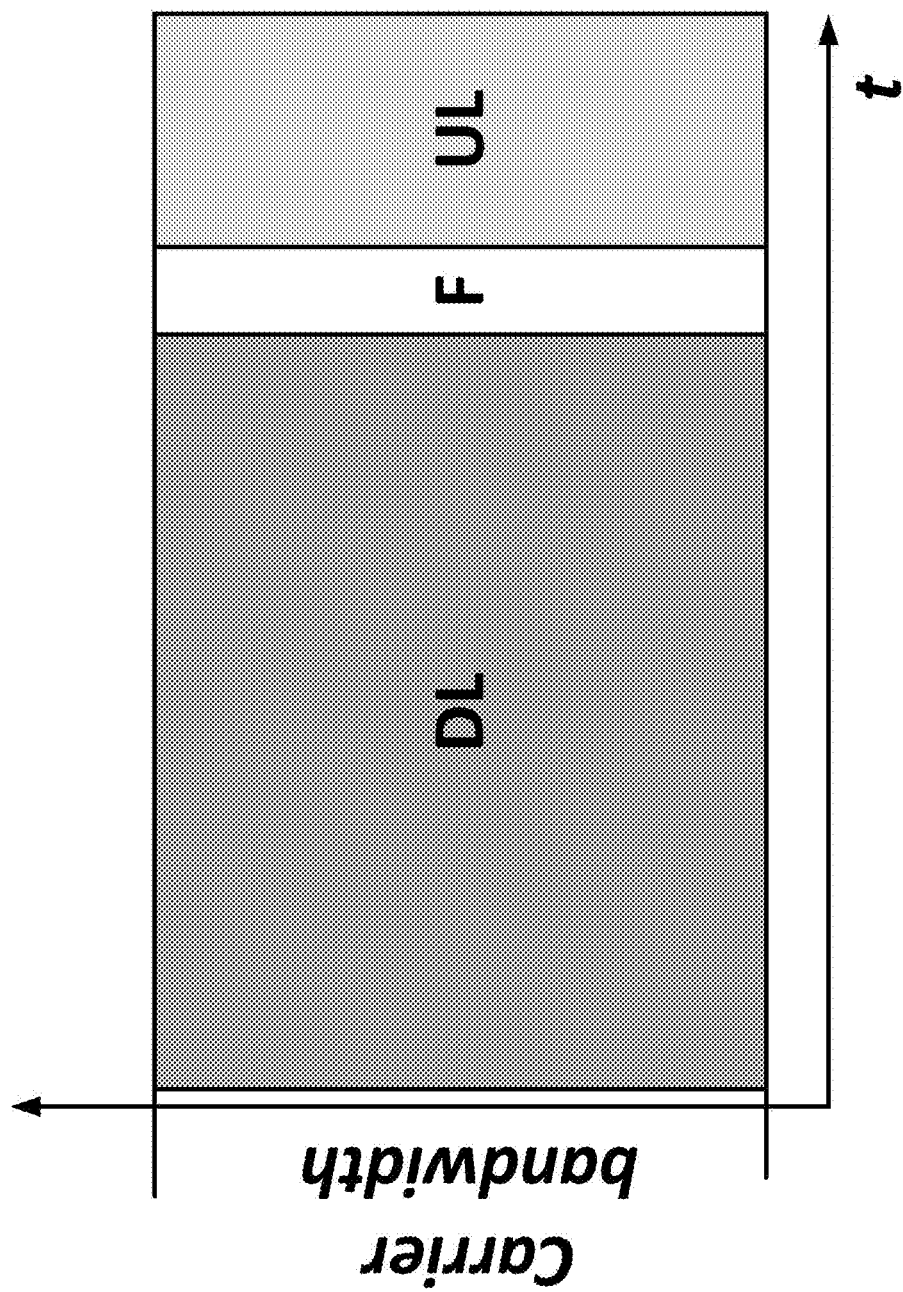
FIG. 3 illustrates an example of unidirectional downlink (DL)/uplink (UL) resource allocation in a serving cell, in accordance with various embodiments.

For a serving cell, DL/UL resources can be configured unidirectionally in time domain. The time domain granularity can be an OFDM symbol. In NR Rel-15/16/17, a symbol can be either a DL symbol, a UL symbol, or a flexible symbol as shown via the example in FIG. 3. Further, such attribution between DL/UL/Flexible can be indicated to a UE via cell specific or UE specific semi-static signaling or dynamic signaling. The signaling is applied to all BWPs and all carriers with different SCS (not including supplementary UL or SUL) associated with a serving cell.

Figure 4:
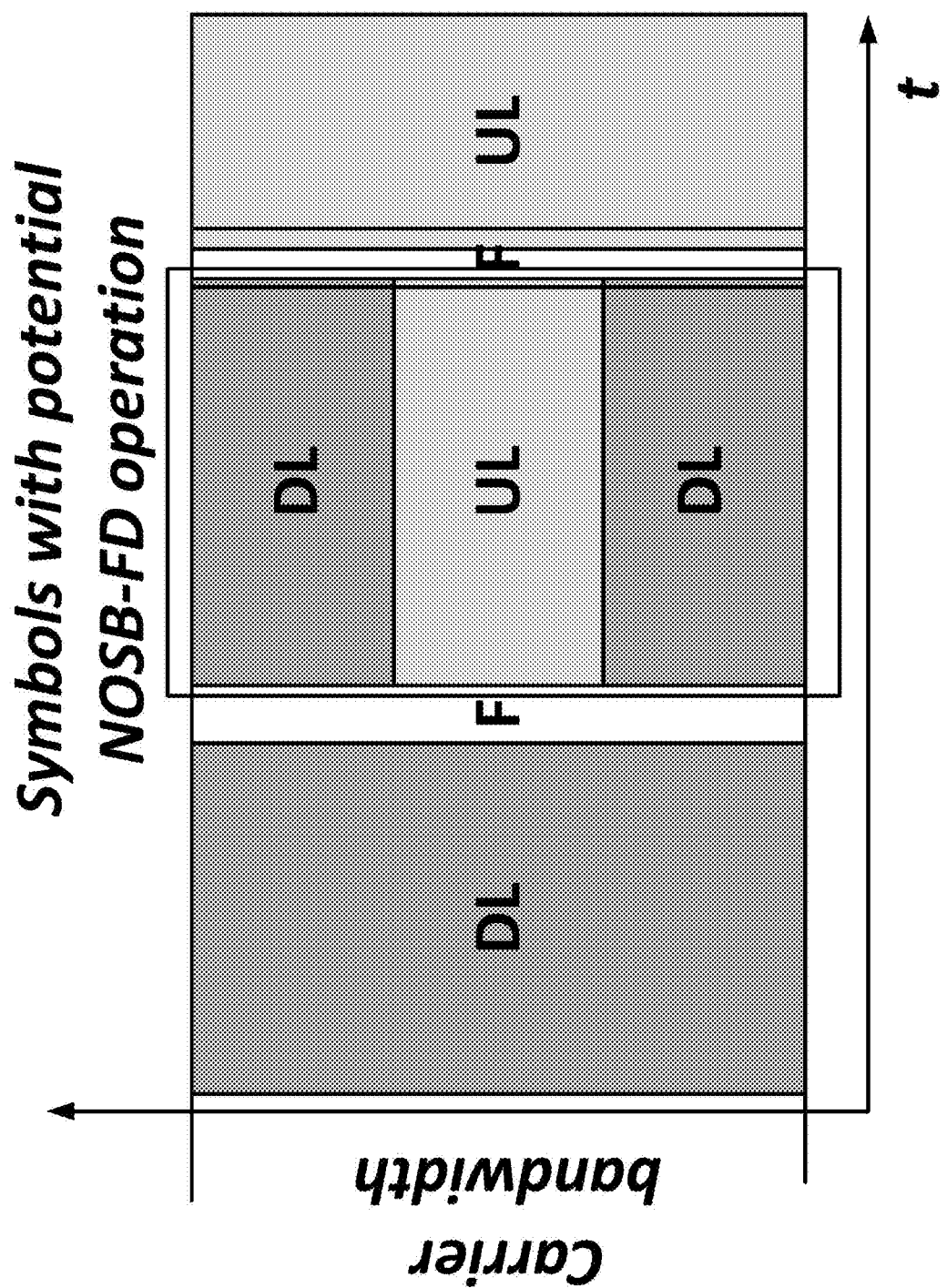
FIG. 4 illustrates an example of non-overlapping sub-band full duplex (NOSB-FD)-based DL/UL resource allocation in a serving cell, in accordance with various embodiments.

For a serving cell with NOSB-FD operation, a symbol can be used to map both DL and UL physical channels or signals. Thus, for a given PRB in a symbol, the resources may be identified as DL, UL, or flexible resources as illustrated in FIG. 4. In a symbol, frequency resources may be divided into DL/UL/Flexible resources in different non-overlapped sub-bands. Here and in the rest of the disclosure, a "sub-band" corresponds to a set of physical resources within a carrier that are contiguous in frequency, e.g., a number of consecutive Physical Resource Blocks (PRBs) on the Common Resource Block (CRB) grid. The configuration of sub-bands may be provided to a UE via explicit or implicit configuration. In one option, the sub-band configuration can be provided to the UE via UE-specific Radio Resource Control (RRC) signaling. In another option, the sub-band configuration can be provided to the UE via system information (SI), e.g., in RMSI (SIB1). In another option, the sub-band configuration can be provided to the UE via slot format information in DCI, e.g., SFI by DCI 2_0. The sub-band can be configured as DL, UL or Flexible SBs, or either DL or UL SBs, or only as UL SBs. If a sub-band is not explicitly configured as DL, UL or Flexible SBs, the sub-band can be implicitly identified as Flexible SB in a flexible symbol, or as DL SB in a DL symbol, or as UL SB in a UL symbol, respectively. For a "Flexible SB", the corresponding resources may be used for either DL reception or UL transmission, and the UE is expected to follow one or more of: higher layer configurations and dynamic signaling, and any applicable collision/overlap handling rules, to determine whether certain time-frequency resources are to be used for UL transmission or DL reception in a given symbol.

In the following, a DL/UL/Flexible symbol implies a symbol in which the gNB may transmit in one direction in the symbol, e.g., DL, UL, either DL or UL for DL/UL/Flexible symbol respectively. A "symbol with potential NOSB-FD operation" (may also be referred to as "FD symbol" for brevity) implies a symbol in which the gNB may transmit in the DL and receive in the UL simultaneously. Such a symbol may be identified by a UE based on configuration of sub-bands (e.g., when configured with at least one DL and at least one UL sub-band in the symbol), or based on one or more of: TDD configuration, dynamic Layer 1 indication of slot formats (e.g., via DCI format 2_0), higher layer configuration, or dynamic L1 signaling of transmission or reception occasions. For example, higher layer configuration for NOSB-FD symbol location can indicate symbol/slot index for NOSB-FD symbols within a period.

In one embodiment, the relation between UL-DL configuration for DL/UL/Flexible resources (via higher layer signaling or dynamic indication) and dynamic scheduling for DL/UL channels/signals can be determined according to one or more of:
  A UE does not expect to receive a dynamic scheduling for a UL transmission not confined within the UL SB, e.g., overlapping with a DL SB.
  A UE does not expect to receive a dynamic scheduling for DL reception not confined within the DL SB, e.g., overlapping with a UL SB.
  A UE may be scheduled such that a dynamic DL reception overlaps with physical resources indicated as part of UL SB.
  A UE may be scheduled such that a dynamic DL reception overlaps with physical resources indicated as part of UL SB, if the dynamic DL reception is a cell-specific DL signal/channel, e.g., SIB1.
  A UE may be scheduled such that a dynamic DL reception overlaps with physical resources indicated as part of UL SB in a NOSB-FD symbol, if the symbol is only used for DL without any UL from any UE. For example, though a symbol is configured NOSB-FD symbol, gNB decides to only use the symbol for DL transmission. In the example, UE assumes the NOSB-FD symbol switches to non-NOSB-FD symbol, if the UE is be scheduled such that a dynamic DL reception overlaps with physical resources indicated as part of UL SB in the NOSB-FD symbol.
  If a UE is not provided with UL-DL configuration for sub-band, the UE can expect to receive a dynamic scheduling for UL transmission overlapping with a DL symbol indicated by the cell-specific UL-DL configuration. The UL-DL configuration for sub-band can be subband frequency location and/or NOSB-FD symbol location.
  If a UE is not provided with UL-DL configuration for sub-band, the UE can expect to receive a dynamic scheduling for UL transmission overlapping with a DL symbol indicated by the cell-specific UL-DL configuration or UE-specific UL-DL configuration.

For the above embodiments, the dynamic DL reception may include PDCCH, dynamic scheduling PDSCH, aperiodic CSI-RS transmission, etc.

On the one hand, UE behavior may be simplified if gNB always avoids any dynamic scheduling of UL transmission overlapping with a DL SB, or a DL reception overlapping with a UL SB. On the other hand, considering the resource allocation granularity in frequency domain could be larger than one PRB, e.g., RBG, it would be beneficial to allow gNB to allocate DL or UL frequency resource overlapping with UL or DL sub-bands respectively while UE only receives or transmits on the non-overlapped frequency resources to fully utilize the PRBs in a RBG not overlapping with the UL sub-band or DL sub-band.

In one embodiment, for a given NOSB-FD symbol the relation between UL-DL sub-band (SB) configuration for DL/UL/Flexible resources (via higher layer signaling or dynamic indication) and DL/UL channels/signals configured by higher layer can be determined according to one or more of:

A UE does not expect an UL transmission to be configured overlapping with a DL SB.

A UE does not expect a DL reception to be configured overlapping with a UL SB.

A UE may be configured such that an higher layer configured DL reception occasion overlaps with physical resources indicated as part of UL SB.

A UE does not expect a cell-specific UL transmission to be configured overlapping with a DL SB, e.g., PRACH/Msg A PUSCH for RACH procedure.

A UE does not expect a cell-specific DL reception to be configured overlapping with a UL SB, e.g., SS/PBCH configured in MIB, or Type0-PDCCH CSS configured in MIB.

A UE can expect an UL transmission to be configured overlapping with a DL SB.

A UE can expect a DL reception to be configured overlapping with a DL SB.

On the one hand, UE behavior may be simplified if gNB always avoids configuring UL transmission overlapping with a DL SB, or a DL reception overlapping with a UL SB. On the other hand, to provide more flexibility for semi-static resource allocation, e.g., in some slot the whole bandwidth is only for either DL or UL while in some slots some sub-band is for DL and some sub-band is for UL, and also considering the resource allocation granularity larger than one PRB, e.g., RBG, it would be beneficial to allow gNB to allocate frequency resource overlapping with UL or DL sub-band while UE only transmits or receives on the non-overlapped frequency resources.

To reduce the impact of cross-link interference between DL and UL transmission in different sub-bands in a NOSB-FD symbol, a guard band between DL and UL frequency resources in the NOSB-FD symbol may be beneficial. gNB can explicitly configure a guard band, or UE can implicitly derive the guard band, or the guard band is transparent to UE.

In one embodiment, the relation between guard band (if the guard band is non-transparent to UE) and dynamically scheduled DL/UL channels/signals can be determined according to one or more of:

A UE does not expect to receive a dynamic scheduling for UL transmission overlapping with the guard band.

A UE does not expect to receive a dynamic scheduling for DL reception overlapping with the guard band.

A UE can expect to receive a dynamic scheduling for UL transmission overlapping with the guard band.

A UE can expect to receive a dynamic scheduling for DL reception overlapping with the guard band.

On one hand, UE behavior may be simplified if gNB always avoids dynamic scheduling of UL transmission or DL reception overlapping with a guard band. On the other hand, to provide more scheduling flexibility and better resource efficiency, e.g., gNB may not occupy the whole UL sub-band for small UL packet thus the guard band derived from DL sub-band boundary is not needed, it would be beneficial to allow gNB to allocate frequency resource overlapping with the guard band.

In one embodiment, the relationship between guard band and DL/UL channels/signals configured by higher layer can be determined according to one or more of:

A UE does not expect an UL transmission to be configured overlapping with the guard band.

A UE does not expect a DL reception to be configured overlapping with the guard band.

A UE can expect an UL transmission to be configured overlapping with the guard band.

A UE can expect a DL reception to be configured overlapping with the guard band.

On one hand, UE behavior may be simplified if gNB always avoids configuring UL transmission or DL reception overlapping with a guard band. On the other hand, to provide more flexibility for semi-static resource allocation and also considering the resource allocation granularity larger than one PRB, e.g., RBG, it would be beneficial to allow gNB to allocate frequency resource overlapping with the guard band.

Pdcch/PDSCH/CSI-RS/SSB Resource Mapping

CSI-RS in the embodiments may be used for different purposes, e.g., CSI-RS for time/frequency tracking, CSI computation, L1-RSRP computation, L1-SINR computation, mobility, and tracking during fast Scell activation.

In one embodiment, for dynamically scheduled PDSCH reception, if the PDSCH may overlap with UL sub-band configured by higher layers, UE may receive the PDSCH according to one or more of the following options:

Opt1: UE receives PDSCH according to the frequency resource allocation indicated by the scheduling DCI.

Opt 1-1: frequency resource allocation is determined according to frequency regions of active BWP bandwidth.

For example, if active DL BWP consists of 100 PRBs, $1^{st}$~$30^{th}$ PRB and 60~$100^{th}$ PRB are for DL sub-band while $31^{th}$~$59^{th}$ PRB are for UL sub-band. If FDRA indicates $1^{st}$~$40^{th}$ PRB for a PDSCH, the PDSCH occupies $1^{st}$~$40^{th}$ PRB.

Opt 1-2: frequency resource allocation is determined according to frequency regions other than UL sub-band.

For example, if active DL BWP consists of 100 PRBs, $1^{st}$~$30^{th}$ PRB and 60~$100^{th}$ PRB are for DL sub-band while $31^{th}$~$59^{th}$ PRB are for UL sub-band. If FDRA indicates $1^{st}$~$40^{th}$ PRB for a PDSCH, the PDSCH occupies $1^{st}$~$30^{th}$ and $60^{th}$~$69^{th}$ PRB.

In one option, the RBG size is determined by the bandwidth of active BWP as shown in table below. In another option, the RBG size is determined by the bandwidth for DL subbands, e.g. replacing 'Bandwidth Part Size' with 'DL subbands Size'. For example, for a DL BWP with 200 PRBs and DL subbands within DL BWP only has 120 PRBs, the RBG size is 8 PRB by configuration 1 and 16 by configuration 2. Similar mechanism can be applied for PUSCH frequency resource determination.

TABLE 1

| Nominal RBG size P | | |
| --- | --- | --- |
| Bandwidth Part Size | Configuration 1 | Configuration 2 |
| 1-36 | 2 | 4 |
| 37-72 | 4 | 8 |

TABLE 1-continued

| | Nominal RBG size P | |
|---|---|---|
| Bandwidth Part Size | Configuration 1 | Configuration 2 |
| 73-144 | 8 | 16 |
| 145-275 | 16 | 16 |

In one option, the FDRA bit field length in DCI can be determined by the maximum between the number of bits for FDRA determined according to active BWP bandwidth and the number of bits for FDRA determined by DL subbands. In another option, the FDRA bit field length in DCI for PDSCH in NOSB-FD symbol can be determined by DL subbands. For example, if different DCI formats or different search spaces are configured for PDCCH for NOSB-FD and non-NOSB-FD symbol, the DCI size for PDCCH for NOSB-FD symbol can be determined by DL subbands, and DCI size for PDCCH for non-NOSB-FD symbol is determined by active BWP. Similar mechanism can be applied for PUSCH frequency resource determination.

Opt2: UE receives PDSCH according to the frequency resource allocation indicated by the scheduling DCI and the sub-band information.

Opt 2-1: If the frequency resource indicated by the DCI overlaps with the UL-sub-band, UE assumes the PDSCH is rate-matched around the UL sub-band so that UE only receives the PDSCH in PRBs outside the UL sub-band.

Opt 2-2: If the rate matching pattern is also indicated in the DCI, UE shall also assume the PDSCH is rate matched according to the rate matching pattern. In one option, gNB configures the rate matching pattern to ensure the PDSCH is rate matched around the UL sub-band. For example, gNB uses legacy RB symbol level rate matching pattern to cover the UL sub-band, or gNB may use sub-band level rate matching pattern to cover the UL sub-band. Opt 2-2: If the frequency resource indicated by the DCI overlaps with the UL-sub-band indicated/configured for rate matching, UE assumes the PDSCH is rate-matched around the UL sub-band so that UE only receives the PDSCH in PRBs outside the UL sub-band.

For example, if gNB indicates the rate matching pattern for UL sub-band, UE assumes PDSCH is rate matched around the UL sub-band, otherwise, if gNB configures the UL sub-band as one of the rate matching pattern while a DCI scheduling the PDSCH does not indicate the UL sub-band for rate matching, UE assumes PDSCH is not rate-matched around the UL sub-band, e.g., UE still receives PDSCH in UL sub-band.

In one option, legacy RB symbol level rate matching pattern can be configured to cover the UL sub-band. In another option, gNB may configure sub-band level rate matching pattern.

In case of rate-matching, PDSCH transport block size determination is performed over the actual number of PRBs in the PDSCH allocation after rate-matching.

Opt 2-3: If the frequency resource indicated by the DCI overlaps with the UL-sub-band, UE assumes that while encoded bits are generated corresponding to the resources in the affected PRBs, the PDSCH symbols are not mapped to the PRBs overlapping with the UL sub-band (also referred to as "puncturing") so that UE only receives the PDSCH in PRBs outside the UL sub-band.

In one example, same option is applied for PDSCH scheduled by any DCI. In another example, different options can be applied for PDSCHs scheduled by different DCI formats. For example, for a PDSCH scheduled by a fallback DCI, e.g., DCI format 1_0, option 1-1 is applied, while option 1-2 is applied for DCI format 1_1. In another example, different options can be applied for PDSCH scheduled by DCI in different search space. For example, for a PDSCH scheduled by a DCI in CSS, option 1-1 is applied, while option 1-2 is applied for DCI in USS. In another example, which option to be used is indicated by gNB. For example, gNB can indicate whether to use option 1-1 or option 2-1 by one bit in the DCI for PDSCH scheduling, or gNB can indicate whether a NOSB-FD symbol is switched to non-NOSB-FD symbol in a DCI and UE applies option 1-1 or option 2-1 based on this indication, where this indication can be in the same DCI for PDSCH scheduling or a separate DCI. Similar mechanism can be applied for PUSCH.

Similarly, if dynamically scheduled PDSCH reception can overlap with guard band, UE may receive the PDSCH according to the frequency resource allocation indicated by the scheduling DCI without consideration of guard band. Alternatively, UE may assume rate matching around or puncturing in PRBs overlapping with the guard band.

In one embodiment, for dynamically scheduled/triggered CSI-RS reception, if the CSI-RS can overlap with UL sub-band, UE may skip CSI-RS reception, or UE may receive the CSI-RS according to one or more of options as below:

Opt 3: UE receives CSI-RS according to the frequency resource allocation for the CSI-RS resource(s) triggered by the scheduling DCI.

Opt 4: UE receives CSI-RS according to the frequency resource allocation for the CSI-RS resource(s) triggered by the scheduling DCI and the sub-band information.

Opt 4-1: If the frequency resource for CSI-RS overlaps with the UL-sub-band, UE assumes the CSI-RS sequence consecutively maps in PRBs outside the UL sub-band so that UE only receives the CSI-RS in PRBs outside the UL sub-band. In this case, the sequence length for sequence generation is shortened.

Opt 4-2: If the frequency resource for CSI-RS overlaps with the UL-sub-band, UE assumes the PRBs overlapping with the UL sub-band is punctured so that UE only receives the CSI-RS in PRBs outside the UL sub-band.

In one example, which option to be used is indicated by gNB. For example, gNB can indicate whether to use option 3 or option 4 by one bit in the DCI for A-CSI triggering, or gNB can indicate whether a NOSB-FD symbol is switched to non-NOSB-FD symbol in a DCI and UE applies option 3 or option 4 based on this indication, where this indication can be in the same DCI for A-CSI triggering or a separate DCI.

In one option, if a PRB overlaps with UL sub-band, the CSI-RS sequence does not map to the PRB, or UE assumes the PRB is punctured. In another option, assuming a PRB group consists of 4 PRBs with CBR #4*n, 4*n+1, 4*n+2, 4*n+3, if at least one PRB of a PRB group overlaps with UL sub-band, the CSI-RS sequence does not map to any PRB of the PRB group, or UE assumes all PRBs of the PRB group is punctured.

In one option, a CSI-RS resource is configured with frequency resource allocation by indicating a starting PRB and number of PRBs across which CSI-RS resource spans. In another option, a CSI-RS resource can be configured with a list of starting PRBs and number of PRBs. For example, the list consists of $1^{st}$ starting PRB and number of PRBs and $2^{nd}$ starting PRB and number of PRBs. UE does not expect CSI-RS resource overlapping with UL subband. The UL subband is UL subband indicated by cell-specific signaling, or by semi-static signaling which may be cell-specific or UE-specific, or by semi-static and/or dynamic signaling. The CSI-RS resource configuration mechanism can be applied to CSI-RS resource dynamically triggered or configured for CSI-RS reception.

Figure 5B:
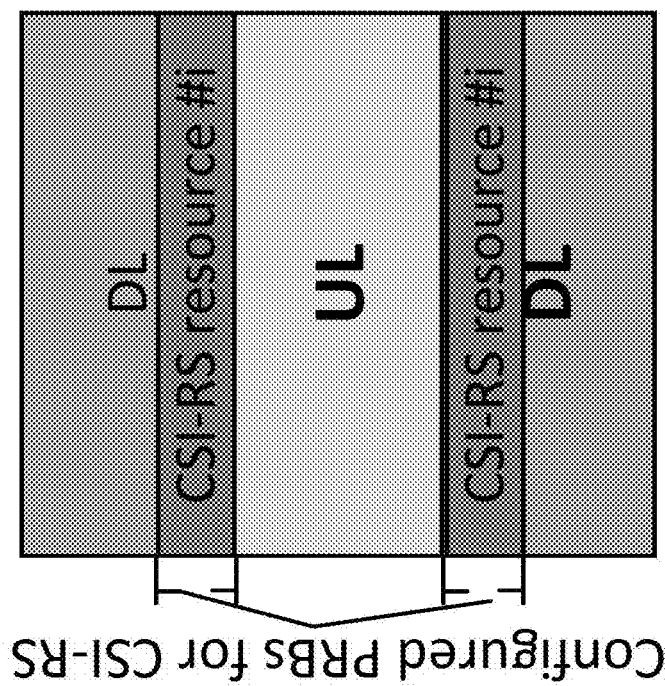
FIG. 5B illustrates an example of a frequency resource allocation configuration for a CSI-RS resource that is non-contiguous in the frequency domain, in accordance with various embodiments.
Figure 5A:
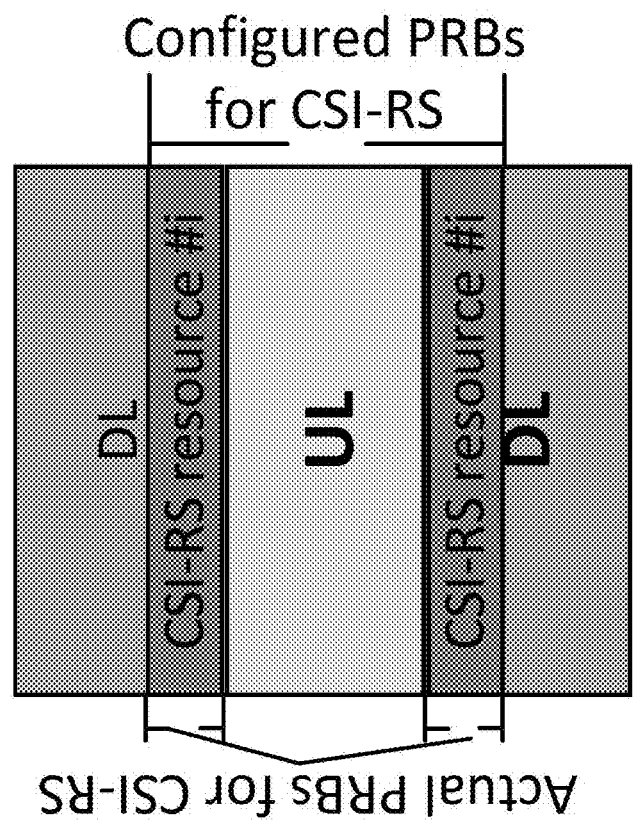
FIG. 5A illustrates an example of a frequency resource allocation configuration for a channel state information-reference signal (CSI-RS) resource that is contiguous in the frequency domain, in accordance with various embodiments.

FIG. 5A provides an example that frequency resource allocation configuration for a CSI-RS resource is contiguous in frequency domain but PRBs for actual CSI-RS resource for reception is non-contiguous due to UL subband, e.g., according to option 4. FIG. 5B provides another example that frequency resource allocation configuration for a CSI-RS resource is non-contiguous in frequency domain.

Similarly, if dynamically scheduled CSI-RS reception can overlap with guard band, UE may skip CSI-RS reception, or receive the CSI-RS according to the frequency resource allocation for the CSI-RS resource(s) triggered by the scheduling DCI without consideration of guard band. Alternatively, UE may assume rate matching around or puncturing in PRBs or PRB groups overlapping with the guard band.

In one embodiment, for configured DL reception, if the DL signal/channel can overlap with UL sub-band, UE may receive the DL signal/channel according to one or more of the following options:

When PDSCH (in the form of Semi-Persistent Scheduling (SPS) PDSCH) is the "configured DL reception"

UE drops a set of symbols of SPS PDSCH reception, if the frequency resource allocation indicated by activation DCI or configured by higher layer overlaps with UL sub-band in the set of symbols. Alternatively, UE drops the whole SPS PDSCH reception.

Alternatively, UE receives SPS PDSCH according to the frequency resource allocation indicated by activation DCI or configured by higher layer and the sub-band information.

Opt 5: If the frequency resource indicated by activation DCI or configured by higher layer overlaps with the UL-sub-band, UE assumes the PDSCH is rate-matched around the UL sub-band so that UE only receives the PDSCH in PRBs outside the UL sub-band.

If a rate matching pattern is also configured, UE may also assume the PDSCH is rate matched according to the rate matching pattern.

Opt 6: If the frequency resource indicated by activation DCI or configured by higher layer overlaps with the UL-sub-band, UE assumes PDSCH symbols are generated but not mapped to the PRBs overlapping with the UL sub-band (also referred to as "puncturing") so that UE only receives the PDSCH in PRBs outside the UL sub-band.

Similarly, if SPS PDSCH reception can overlap with guard band, UE may drop the SPS PDSCH reception, or receive the SPS PDSCH assuming rate matching around or puncturing in PRBs overlapping with the guard band.

When CSI-RS is the "configured DL reception"

UE drops a set of symbols of P-CSI-RS or SP-CSI-RS reception, if the frequency resource allocation configured for the CSI-RS resource overlaps with UL sub-band in the set of symbols. Alternatively, UE drops the whole P-CSI-RS or SP-CSI-RS reception.

Alternatively, UE receives P-CSI-RS or SP-CSI-RS according to the frequency resource allocation configured for the CSI-RS resource and the sub-band information.

Options for dynamically scheduled/triggered CSI-RS reception above can be applied, e.g., Opt 4-1 and Opt 4-2 can be applied.

Similarly, if P-CSI-RS or SP-CSI-RS reception can overlap with guard band, UE may drop the P-CSI-RS or SP-CSI-RS reception, or receive the P-CSI-RS or SP-CSI-RS assuming rate matching or puncture for PRBs or PRB groups overlapping with the guard band.

For different CSI-RS for different purposes, different options can be applied. For example, UE receives CSI-RS for time/frequency tracking according to the frequency resource allocation configured for the CSI-RS resource and the DL/UL sub-band information, while UE does not expect CSI-RS for CSI computation to overlap with UL subband.

For above options for triggered or configured CSI-RS, in one example, UE does not expect CSI-RS resources within a CSI-RS resource set with repetition 'on' located in symbols with different symbol types (NOSB-FD or non-NOSB-FD). In another example, UE does not expect a CSI-RS resource set for time/frequency tracking in symbols with different symbol types. In another example, UE does not expect a CSI-RS resource for time/frequency tracking in symbols with different symbol types. In another example, UE may expect different CSI-RS resources for time/frequency tracking in symbols with different symbol types and UE does not expect to combine time/frequency estimation results of these CSI-RS resources.

When PDCCH is the "configured DL reception"

UE receives PDCCH according to one of the options as below:

Opt 7: UE drops PDCCH candidate reception, if the frequency resource of the PDCCH candidate overlaps, even partially, with the UL sub-band.

Opt 8: UE assumes a set of REGs associated with a CCE with PRBs overlapping, even partially, with the UL sub-band, is rate matched/not transmitted/or punctured. In other words, if at least one REG of a CCE overlaps with the UL sub-band, the CCE is rate matched/not transmitted/or punctured.

For example, if a UE is configured with AL=2 for PDCCH monitoring, for a PDCCH candidate with 2 CCEs, if $1^{st}$ CCE partially overlaps with the UL sub-band, the CCE is dropped. So, UE monitors the PDCCH only on $2^{nd}$ CCE.

Opt 9: UE assumes a REG or a PRB overlapping, even partially, with the UL sub-band, is rate matched/not transmitted/or punctured. Alternatively, UE assumes a REG bundle overlapping, even partially, with the UL sub-band, is rate matched/not transmitted/or punctured.

Opt 10: UE assumes CCEs are only mapped to REGs in PRBs configured for CORESET that do not overlap with PRBs of the UL sub-band. If the number of CCEs is no smaller than the configured aggregation level for a PDCCH candidate, UE monitors for PDCCH candidate accordingly, e.g., no rate matching or puncturing. If the number of CCEs is smaller than the AL for a PDCCH candidate, the PDCCH candidate is dropped.

In one option, UE assumes CCE-to-REG mapping is according to the indicated PRBs by CORESET configuration information. In another option, UE assumes CCE-to-REG mapping is according to the indicated PRBs by CORESET configuration information and sub-band information, e.g., CCEs only map to REGs outside UL sub-band, or CCEs only map to REG bundles outside UL sub-band, and also the interleaving, if any, is performed within the REGs/REG bundles outside UL sub-band. For one example, for interleaved CCE-to-REG mapping, Np GESET in the function of the interleaver is the number of REGs according to CORE- SET configuration information, or the number of REGs according to CROESET configuration information and sub-band information, e.g., number of REGs within DL sub-bands.

In one option, UE receives PDCCH according to one of opt 7~opt 10, if the PDCCH is in specific SS set, while UE receives other PDCCH according to configuration of CORE-SET without consideration of rate matching/puncture/dropping due to UL sub-band. The specific SS set includes one or more of:
- UE specific SS set
- Type-3 CSS set
- Type-3 CSS set except for SS set for dynamic indication for DL/UL/Flexible sub-band
- Type OA/1/2 CSS set, if the UL sub-band is identified by signaling in SIB1.

Similarly, if a PDCCH candidate can overlap with guard band, UE may drop the PDCCH candidate, or receive the PDCCH candidate assuming rate matching or puncturing in sets of REGs associated with a CCE or PRBs or REGs overlapping with the guard band.

When SS/PBCH is the "configured DL reception"

In an example, UE may receive SS/PBCH, regardless of whether the SS/PBCH may overlap with an UL sub-band or not.

Alternatively, UE may receive SS/PBCH configured in MIB, regardless of whether the SS/PBCH may overlap with an UL sub-band or not. In another example, UE may drop SS/PBCH configured by UE-specific higher layer signaling, if the SS/PBCH overlaps with UL sub-band.

In an example, UE may receive SS/PBCH, regardless of whether the SS/PBCH may overlap with guard band or not.

Alternatively, UE may receive SS/PBCH configured in MIB, regardless of whether the SS/PBCH may overlap with guard band or not. In another example, UE may drop SS/PBCH configured by UE-specific higher layer signaling if the SS/PBCH overlaps with guard band.

In above embodiments for PDCCH/PDSCH/CSI-RS/SSB resource mapping, the UL sub-band/guard band is identified according to DL/UL/Flexible sub-band or guard band information configured by higher layer signaling. In one option, for dropping operation as above, the UL sub-band/guard band can also be identified according to DL/UL/Flexible sub-band or guard band information indicated by dynamic signaling, e.g., DCI 2_0. In one option, for punctured operation as above, the UL sub-band/guard band can also be identified according to DL/UL/Flexible sub-band or guard band information indicated by dynamic signaling, e.g., DCI 2_0.

In above embodiments for PDCCH/PDSCH/CSI-RS/SSB resource mapping, UE may not expect a DL signal/channel occupying a number of symbols such that some symbols are NOSB-FD symbols while other symbols are legacy DL/UL/Flexible symbols. Alternatively, UE does not expect a DL signal/channel occupying a set of symbols with different frequency domain resource allocation (FDRA) due to different DL/UL/Flexible sub-band allocation. Thus, while the sub-band configurations (indicative of extent of DL or UL resources in a symbol) may vary across symbols, the FDRA for an assigned DL channel/signal is not expected to vary across symbols. To ensure same FDRA, one of the options below is applied:

Option A0: The frequency domain resources indicated for the DL signal/channel reception by a DCI format or configured by higher layers is interpreted based on the active BWP, and the UE does not expect to receive an indication that overlaps with an UL sub-band in a FD symbol. In a further variant of this option, the UE may not expect to receive an indication that overlaps with an UL sub-band in a FD symbol unless it is configured or specified to prioritize DL reception in such overlapping resources.

Option A1: The frequency domain resource indicated by DCI or configured by higher layer is interpreted based on the active BWP, and then, dropping/rate matching/puncture can be applied at least for symbols with frequency resource overlapping with an UL sub-band.

Option A2: the frequency domain resource indicated by DCI or configured by higher layer is interpreted based on sub-band configuration, if at least one symbol is a NOSB-FD symbol while another symbol is a full DL/UL/Flexible symbol, or at least $1^{st}$ symbol is a NOSB-FD symbol while another symbol is a full DL/UL/Flexible symbol. Otherwise, the frequency domain resource indicated by DCI or configured by higher layer is interpreted based on the active BWP.

Option A3: the frequency domain resource indicated by DCI or configured by higher layer is interpreted based on the interaction of sub-band allocation and active BWP, if at least one symbol is a NOSB-FD symbol while another symbol is a full DL/UL/Flexible symbol, or at least $1^{st}$ symbol is a NOSB-FD symbol while another symbol is a full DL/UL/Flexible symbol. Otherwise, the frequency domain resource indicated by DCI or configured by higher layer is interpreted based on the active BWP.

In case of DL reception with repetitions or multiple DL receptions scheduled by a single DCI, in one option, the same FDRA is assumed for all receptions. In another option, the same FDRA is assume for each repetition while different FDRA can be applied for different repetitions.

PUSCH/PUCCH/SRS Resource Mapping

In one embodiment, for dynamically scheduled PUSCH transmission, if the PUSCH can overlap with DL sub-band, UE may transmit the PUSCH according to one or more of following options:

Opt 11: UE transmits PUSCH according to the frequency resource allocation indicated by the scheduling DCI. Opt 1-1 and Opt 1-2 for dynamic PDSCH reception above can be applied for PUSCH transmission, by replacing PDSCH reception with PUSCH transmission, replacing DL sub-band with UL sub-band, UL sub-band with DL sub-band, and active DL BWP with active UL BWP.

Opt 12: UE transmits PUSCH according to the frequency resource allocation indicated by the scheduling DCI and the sub-band information.

Opt 12-1: If transform precoding is not enabled, or if a/2-BPSK is not enabled, Opt 2-1 and opt 2-2 for dynamic PDSCH reception above can be applied for PUSCH transmission, by replacing PDSCH reception with PUSCH transmission, replacing DL sub-band with UL sub-band, UL sub-band with DL sub-band, and active DL BWP with active UL BWP.

Opt 12-2: If transform precoding is enabled, or if a/2-BPSK is enabled, UE does not expect the scheduled PUSCH overlapping with DL sub-band, or it is up to UE implementation to drop the UL transmission or transmit according Opt 12-1.

Similarly, if dynamically scheduled PUSCH transmission can overlap with guard band, UE may transmit the PUSCH according to Opt 11 or Opt 12, by replacing the DL sub-band with guard band.

In one embodiment, for dynamically triggered SRS transmission, if the SRS can overlap with a DL sub-band in a NOSB-FD symbol, UE may not be expected to transmit SRS in the symbols with overlap. Alternatively, a UE may transmit the SRS according to one or more of options as below:

Opt 13: UE transmits SRS according to the frequency resource allocation for the SRS resource(s) triggered by the scheduling DCI.

Opt 14: UE transmits SRS according to the frequency resource allocation for the SRS resource(s) triggered by the scheduling DCI and the sub-band information.

Opt 14-1: If the frequency resource for SRS overlaps with the DL-sub-band, UE assumes the SRS sequence consecutively maps in PRBs outside the DL sub-band so that UE only transmits SRS in PRBs outside the DL sub-band. In this case, the sequence length for sequence generation $N_{ZC}$ is shortened. In other words, $N_{ZC}$ in equation below is given by the largest prime number such that $N_{ZC} < M_{ZC}$ and $M_{ZC}$ is determined by the number of PRBs allocated for the SRS and outside the DL sub-band.

$$\bar{r}_{u,v}(n) = x_q(n \bmod N_{ZC})$$

$$x_q(m) = e^{-j\frac{\pi qm(m+1)}{N_{ZC}}}$$

Opt 14-2: If the frequency resource for SRS overlaps with the DL-sub-band, UE assumes the PRBs overlapping with the DL sub-band is punctured so that UE only transmits the SRS in PRBs outside the DL sub-band.

In one option, if a PRB overlaps with DL sub-band, the SRS sequence does not map to the PRB or UE assumes the PRB is punctured. In another option, assuming a PRB group consists of 4 PRBs with CBR #4*n, 4*n+1, 4*n+2, 4*n+3, if at least one PRB of a PRB group overlaps with DL sub-band, the SRS sequence does not map to any PRB of the PRB group, or UE assumes all PRBs of the PRB group is punctured.

Similarly, if dynamically triggered SRS transmission can overlap with guard band, UE may skip the SRS transmission or transmit the SRS according to Opt 13 or Opt 14-2, by replacing the DL sub-band with guard band.

In one embodiment, for dynamically scheduled PUCCH transmission, if the PUCCH may overlap with a DL sub-band in a NOSB-FD symbol, UE may not be expected to transmit the PUCCH. Alternatively, a UE may transmit the PUCCH according to one or more of options as below:

Opt 15: UE may transmit PUCCH according to the frequency resource allocation of PUCCH resource indicated by the scheduling DCI.

Opt 16: UE may transmit PUCCH according to the frequency resource allocation indicated by the scheduling DCI and the sub-band information.

Opt 16-1: If transform precoding is not enabled (e.g., PUCCH format 2), or if π/2-BPSK is not enabled, PUCCH is rate-matched around or punctured in PRBs overlapping with DL sub-band.

Opt 16-2: If transform precoding is enabled (e.g., PUCCH format 3), or if π/2-BPSK is enabled, UE does not expect the scheduled PUCCH overlapping with DL sub-band, or it is up to UE implementation to drop the UL transmission or transmit according Opt 16-1.

Similarly, if dynamically scheduled PUCCH transmission can overlap with guard band, UE may transmit the PUCCH according to Opt 15 or Opt 16, by replacing the DL sub-band with guard band.

In one embodiment, for configured UL reception, if the UL signal/channel may overlap with a DL sub-band in a NOSB-FD symbol, UE behavior may be defined according to one or more of options as below:

CG PUSCH

UE drops a set of symbols of CG PUSCH transmission, if the frequency resource allocation indicated by activation DCI or configured by higher layer overlaps with DL sub-band in the set of symbols. Alternatively, UE drops the whole CG PUSCH transmission.

Alternatively, UE transmits CG PUSCH according to the frequency resource allocation indicated by activation DCI or configured by higher layer and the sub-band information. Opt 12-1 and 12-2 for dynamically scheduled PUSCH can be applied.

Similarly, if CG PUSCH can overlap with guard band, UE may drop the CG PUSCH transmission, or transmit the CG PUSCH assuming rate matching or puncture for PRBs overlapping with the guard band similar to Opt 12-1 and 12-2.

P-SRS or SP-SRS

UE drops a set of symbols of P-SRS or SP-SRS transmission, if the frequency resource allocation indicated by activation DCI or configured by higher layer overlaps with DL sub-band in the set of symbols. Alternatively, UE drops the whole P-SRS or SP-SRS transmission.

Alternatively, UE transmits P-SRS or SP-SRS according to the frequency resource allocation indicated by activation DCI or configured by higher layer and the sub-band information. Opt 14-1 and 14-2 for dynamically triggered SRS can be applied.

Similarly, if P-SRS or SP-SRS can overlap with guard band, UE may drop the P-SRS or SP-SRS transmission or transmit the P-SRS or SP-SRS assuming rate matching or puncture for PRBs overlapping with the guard band similar to Opt 14-1 and 14-2.

Configured PUCCH

UE drops a set of symbols of configured PUCCH transmission, if the frequency resource allocation indicated by activation DCI or configured by higher layer overlaps with DL sub-band in the set of symbols. Alternatively, UE drops the whole configured PUCCH transmission.

Alternatively, UE transmits configured PUCCH according to the frequency resource allocation indicated by activation DCI or configured by higher layer and the sub-band information. Opt 16-1 and 16-2 for dynamically scheduled PUCCH can be applied.

Similarly, if configured PUCCH can overlap with guard band, UE may drop the configured PUCCH transmission, or transmit the configured PUCCH assuming rate matching or puncture for PRBs overlapping with the guard band similar to opt 16-1 and 16-2.

In above embodiments, the DL sub-band/guard band is identified according to DL/UL/Flexible sub-band or guard band information configured by higher layer signaling. In one option, for dropping operation above, the DL sub-band/guard band can also be identified according to DL/UL/Flexible sub-band or guard band information indicated by dynamic signaling, e.g., DCI 2_0. In one option, for PUCCH deferral caused by overlapping with DL sub-band or guard band, the DL sub-band/guard band is identified according to DL/UL/Flexible sub-band or guard band information configured by higher layer signaling. In one option, for puncturing operation above, the DL sub-band/guard band can also be identified according to DL/UL/Flexible sub-band or guard band information indicated by dynamic signaling, e.g., DCI 2_0.

In above embodiments for PUSCH/PUCCH/SRS resource mapping, in an example, UE does not expect a UL signal/channel occupying a set of symbols wherein some symbols are NOSB-FD symbols while other symbols are legacy DL/UL/Flexible symbol. Alternatively, UE does not expect a UL signal/channel occupying a set of symbols with different frequency domain resource allocation (FDRA) due to different DL/UL/Flexible sub-band allocation. Thus, while the sub-band configurations may vary across symbols, the FDRA for an assigned DL channel/signal is not expected to vary across symbols. To ensure same FDRA, one of the options as option A0/A1/A2/A3 as described for DL channel/signal reception can be applied.

In case of UL transmission with repetitions or multiple UL transmissions scheduled by a single DCI, in one option, the same FDRA is assumed for all transmissions. In another option, the same FDRA is assume for each repetition while different FDRA can be applied for different repetitions.

Systems and Implementations

Figure 6:
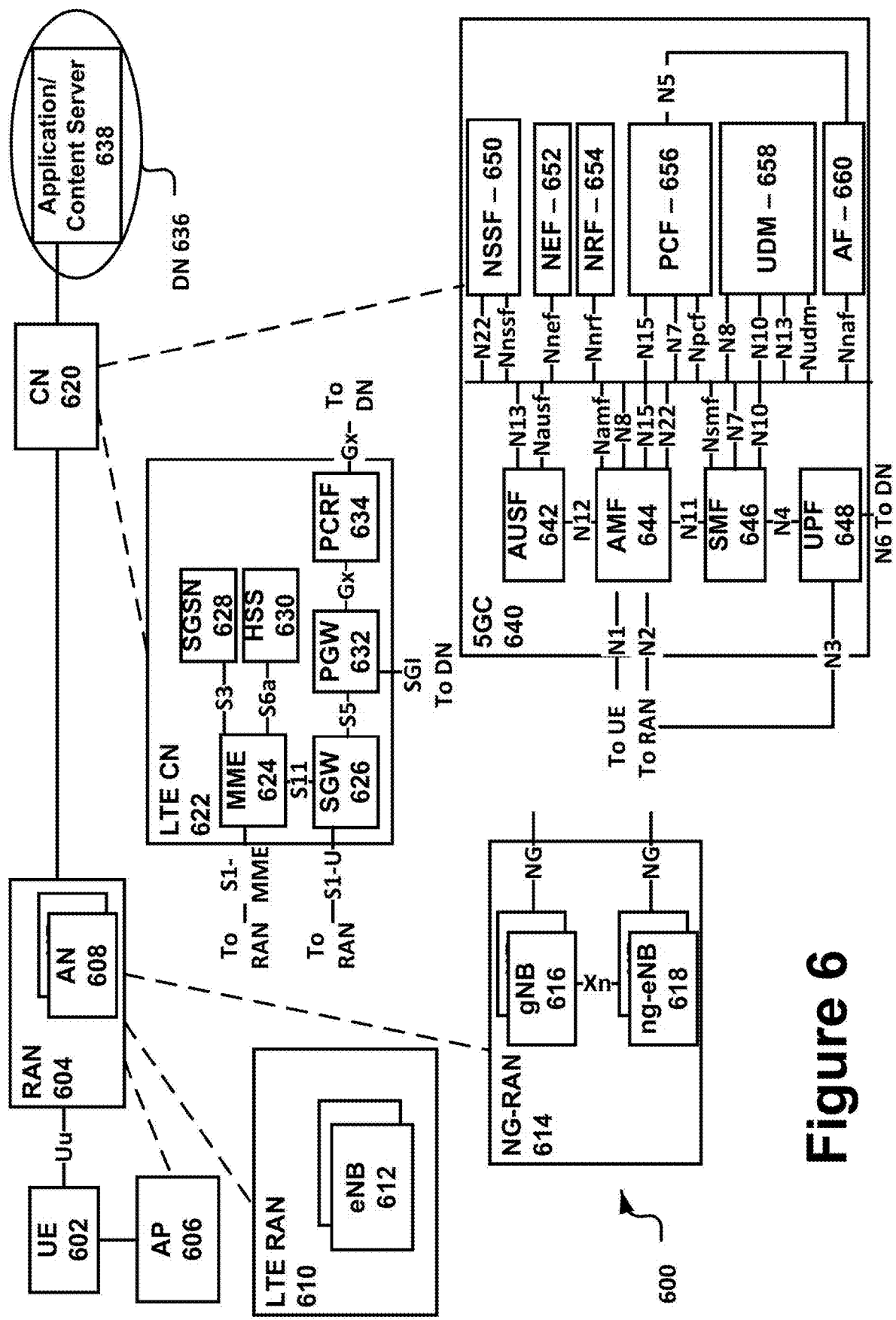
FIG. 6 schematically illustrates a wireless network in accordance with various embodiments.
Figure 7:
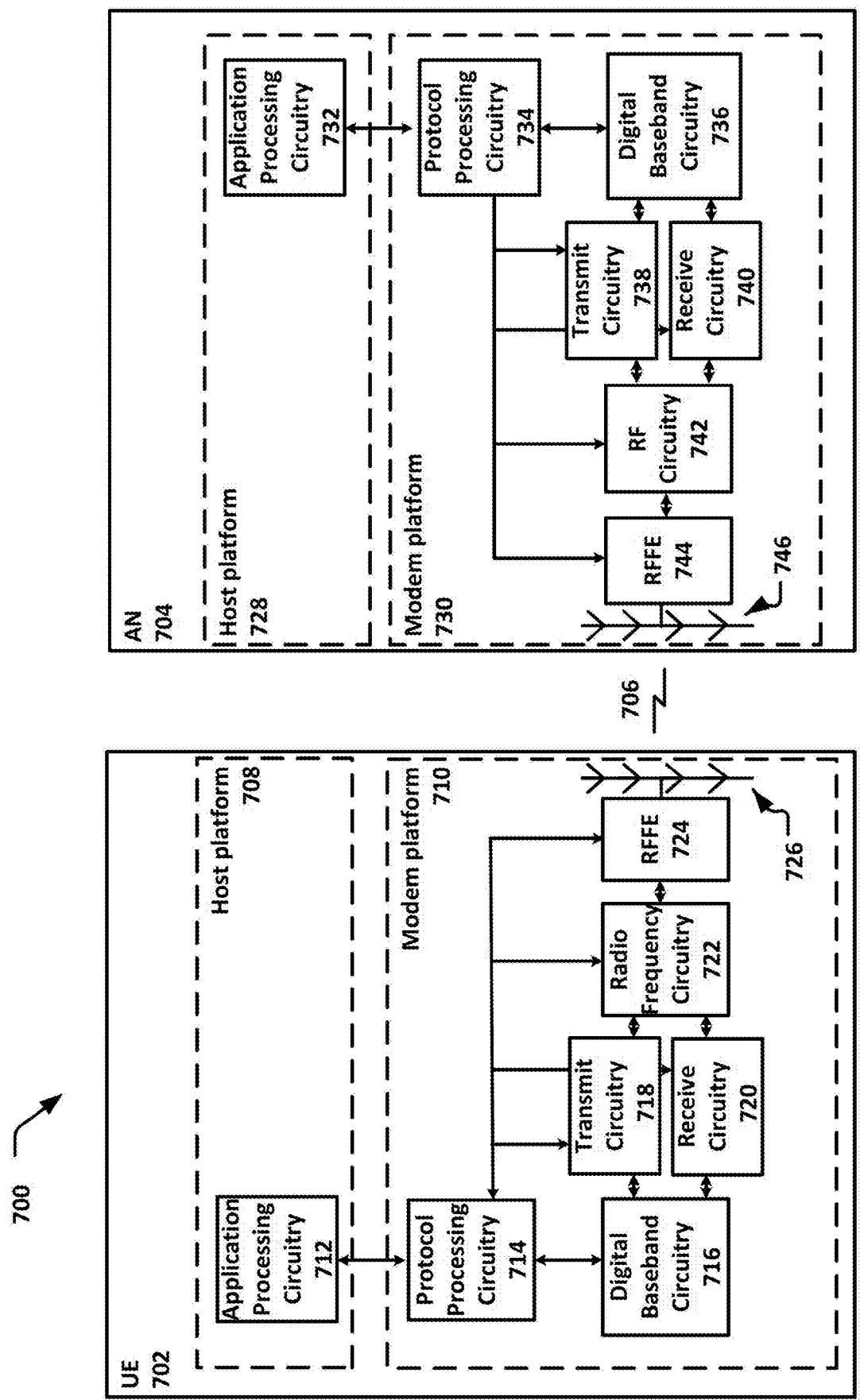
FIG. 7 schematically illustrates components of a wireless network in accordance with various embodiments.
Figure 8:
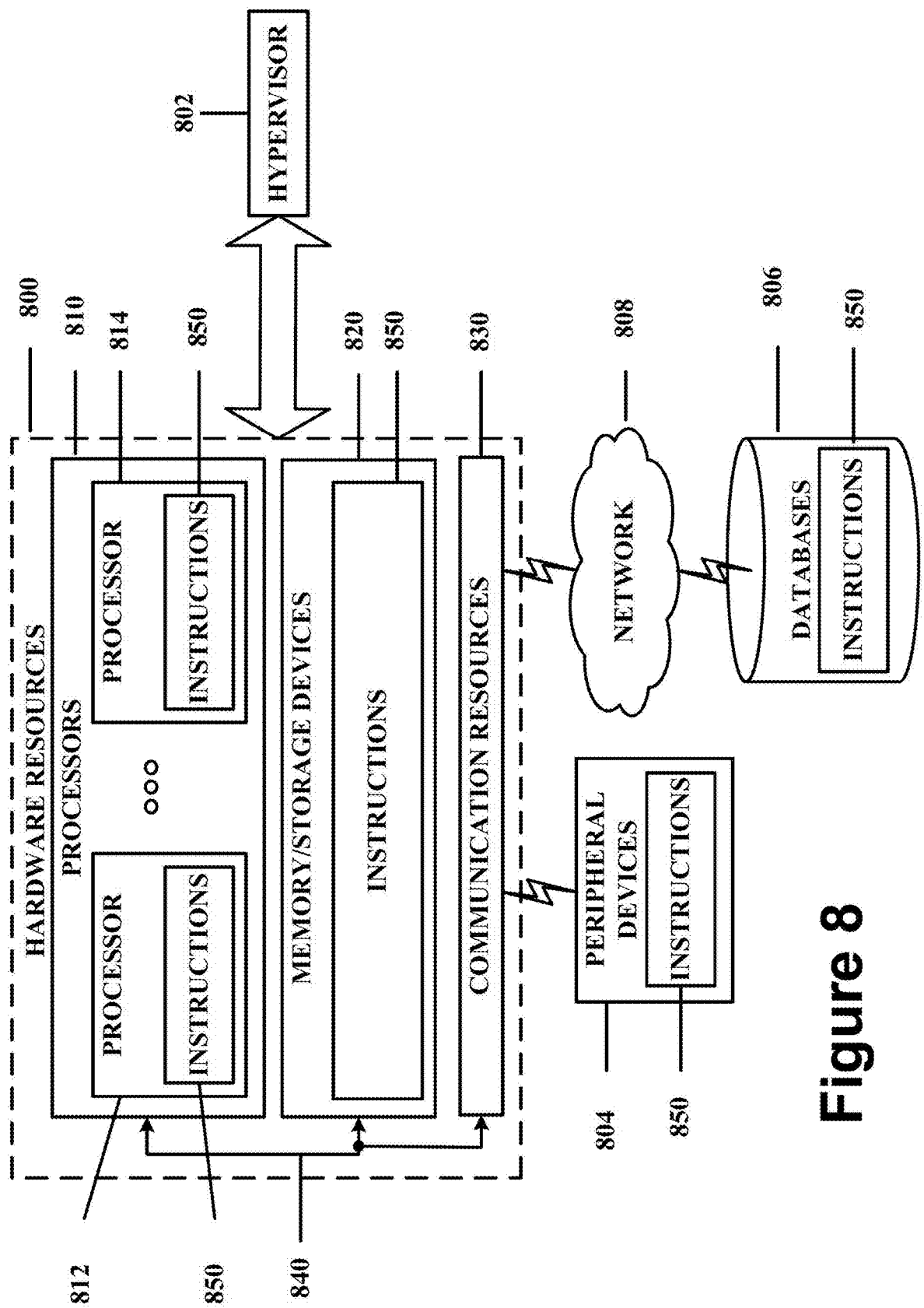
FIG. 8 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 6-8 illustrate various systems, devices, and components that may implement aspects of disclosed embodiments.

FIG. 6 illustrates a network 600 in accordance with various embodiments. The network 600 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 600 may include a UE 602, which may include any mobile or non-mobile computing device designed to communicate with a RAN 604 via an over-the-air connection. The UE 602 may be communicatively coupled with the RAN 604 by a Uu interface. The UE 602 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 600 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 602 may additionally communicate with an AP 606 via an over-the-air connection. The AP 606 may manage a WLAN connection, which may serve to offload some/all network traffic from the RAN 604. The connection between the UE 602 and the AP 606 may be consistent with any IEEE 802.11 protocol, wherein the AP 606 could be a wireless fidelity (Wi-Fi®) router. In some embodiments, the UE 602, RAN 604, and AP 606 may utilize cellular-WLAN aggregation (for example, LWA/LWIP). Cellular-WLAN aggregation may involve the UE 602 being configured by the RAN 604 to utilize both cellular radio resources and WLAN resources.

The RAN 604 may include one or more access nodes, for example, AN 608. AN 608 may terminate air-interface protocols for the UE 602 by providing access stratum protocols including RRC, PDCP, RLC, MAC, and L1 protocols. In this manner, the AN 608 may enable data/voice connectivity between CN 620 and the UE 602. In some embodiments, the AN 608 may be implemented in a discrete device or as one or more software entities running on server computers as part of, for example, a virtual network, which may be referred to as a CRAN or virtual baseband unit pool. The AN 608 be referred to as a BS, gNB, RAN node, eNB, ng-eNB, NodeB, RSU, TRxP, TRP, etc. The AN 608 may be a macrocell base station or a low power base station for providing femtocells, picocells or other like cells having smaller coverage areas, smaller user capacity, or higher bandwidth compared to macrocells.

In embodiments in which the RAN 604 includes a plurality of ANs, they may be coupled with one another via an X2 interface (if the RAN 604 is an LTE RAN) or an Xn interface (if the RAN 604 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 604 may each manage one or more cells, cell groups, component carriers, etc. to provide the UE 602 with an air interface for network access. The UE 602 may be simultaneously connected with a plurality of cells provided by the same or different ANs of the RAN 604. For example, the UE 602 and RAN 604 may use carrier aggregation to allow the UE 602 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 604 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 602 or AN 608 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 604 may be an LTE RAN 610 with eNBs, for example, eNB 612. The LTE RAN 610 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 604 may be an NG-RAN 614 with gNBs, for example, gNB 616, or ng-eNBs, for example, ng-eNB 618. The gNB 616 may connect with 5G-enabled UEs using a 5G NR interface. The gNB 616 may connect with a 5G core through an NG interface, which may include an N2 interface or an N3 interface. The ng-eNB 618 may also connect with the 5G core through an NG interface, but may connect with a UE via an LTE air interface. The gNB 616 and the ng-eNB 618 may connect with each other over an Xn interface.

In some embodiments, the NG interface may be split into two parts, an NG user plane (NG-U) interface, which carries traffic data between the nodes of the NG-RAN 614 and a UPF 648 (e.g., N3 interface), and an NG control plane (NG-C) interface, which is a signaling interface between the nodes of the NG-RAN 614 and an AMF 644 (e.g., N2 interface).

The NG-RAN 614 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 602 can be configured with multiple BWPs where each BWP configuration has a different SCS. When a BWP change is indicated to the UE 602, the SCS of the transmission is changed as well. Another use case example of BWP is related to power saving. In particular, multiple BWPs can be configured for the UE 602 with different amount of frequency resources (for example, PRBs) to support data transmission under different traffic loading scenarios. A BWP containing a smaller number of PRBs can be used for data transmission with small traffic load while allowing power saving at the UE 602 and in some cases at the gNB 616. A BWP containing a larger number of PRBs can be used for scenarios with higher traffic load.

The RAN 604 is communicatively coupled to CN 620 that includes network elements to provide various functions to support data and telecommunications services to customers/subscribers (for example, users of UE 602). The components of the CN 620 may be implemented in one physical node or separate physical nodes. In some embodiments, NFV may be utilized to virtualize any or all of the functions provided by the network elements of the CN 620 onto physical compute/storage resources in servers, switches, etc. A logical instantiation of the CN 620 may be referred to as a network slice, and a logical instantiation of a portion of the CN 620 may be referred to as a network sub-slice.

In some embodiments, the CN 620 may be an LTE CN 622, which may also be referred to as an EPC. The LTE CN 622 may include MME 624, SGW 626, SGSN 628, HSS 630, PGW 632, and PCRF 634 coupled with one another over interfaces (or "reference points") as shown. Functions of the elements of the LTE CN 622 may be briefly introduced as follows.

The MME 624 may implement mobility management functions to track a current location of the UE 602 to facilitate paging, bearer activation/deactivation, handovers, gateway selection, authentication, etc.

The SGW 626 may terminate an S1 interface toward the RAN and route data packets between the RAN and the LTE CN 622. The SGW 626 may be a local mobility anchor point for inter-RAN node handovers and also may provide an anchor for inter-3GPP mobility. Other responsibilities may include lawful intercept, charging, and some policy enforcement.

The SGSN 628 may track a location of the UE 602 and perform security functions and access control. In addition, the SGSN 628 may perform inter-EPC node signaling for mobility between different RAT networks; PDN and S-GW selection as specified by MME 624; MME selection for handovers; etc. The S3 reference point between the MME 624 and the SGSN 628 may enable user and bearer information exchange for inter-3GPP access network mobility in idle/active states.

The HSS 630 may include a database for network users, including subscription-related information to support the network entities' handling of communication sessions. The HSS 630 can provide support for routing/roaming, authentication, authorization, naming/addressing resolution, location dependencies, etc. An S6a reference point between the HSS 630 and the MME 624 may enable transfer of subscription and authentication data for authenticating/authorizing user access to the LTE CN 620.

The PGW 632 may terminate an SGi interface toward a data network (DN) 636 that may include an application/content server 638. The PGW 632 may route data packets between the LTE CN 622 and the data network 636. The PGW 632 may be coupled with the SGW 626 by an S5 reference point to facilitate user plane tunneling and tunnel management. The PGW 632 may further include a node for policy enforcement and charging data collection) for example, PCEF(. Additionally, the SGi reference point between the PGW 632 and the data network 636 may be an operator external public, a private PDN, or an intra-operator packet data network, for example, for provision of IMS services. The PGW 632 may be coupled with a PCRF 634 via a Gx reference point.

The PCRF 634 is the policy and charging control element of the LTE CN 622. The PCRF 634 may be communicatively coupled to the app/content server 638 to determine appropriate QoS and charging parameters for service flows. The PCRF 632 may provision associated rules into a PCEF (via Gx reference point) with appropriate TFT and QCI.

In some embodiments, the CN 620 may be a 5GC 640. The 5GC 640 may include an AUSF 642, AMF 644, SMF 646, UPF 648, NSSF 650, NEF 652, NRF 654, PCF 656, UDM 658, and AF 660 coupled with one another over interfaces (or "reference points") as shown. Functions of the elements of the 5 GC 640 may be briefly introduced as follows.

The AUSF 642 may store data for authentication of UE 602 and handle authentication-related functionality. The AUSF 642 may facilitate a common authentication framework for various access types. In addition to communicating with other elements of the 5GC 640 over reference points as shown, the AUSF 642 may exhibit an Nausf service-based interface.

The AMF 644 may allow other functions of the 5GC 640 to communicate with the UE 602 and the RAN 604 and to subscribe to notifications about mobility events with respect to the UE 602. The AMF 644 may be responsible for registration management (for example, for registering UE 602), connection management, reachability management, mobility management, lawful interception of AMF-related events, and access authentication and authorization. The AMF 644 may provide transport for SM messages between the UE 602 and the SMF 646, and act as a transparent proxy for routing SM messages. AMF 644 may also provide transport for SMS messages between UE 602 and an SMSF. AMF 644 may interact with the AUSF 642 and the UE 602 to perform various security anchor and context management functions. Furthermore, AMF 644 may be a termination point of a RAN CP interface, which may include or be an N2 reference point between the RAN 604 and the AMF 644; and the AMF 644 may be a termination point of NAS (N1) signaling, and perform NAS ciphering and integrity protection. AMF 644 may also support NAS signaling with the UE 602 over an N3 IWF interface.

The SMF 646 may be responsible for SM (for example, session establishment, tunnel management between UPF 648 and AN 608); UE IP address allocation and management) including optional authorization(; selection and control of UP function; configuring traffic steering at UPF 648 to route traffic to proper destination; termination of interfaces toward policy control functions; controlling part of policy enforcement, charging, and QoS; lawful intercept (for SM events and interface to LI system(; termination of SM parts of NAS messages; downlink data notification; initiating AN specific SM information, sent via AMF 644 over N2 to AN 608; and determining SSC mode of a session. SM may refer to management of a PDU session, and a PDU session or"session" may refer to a PDU connectivity service that provides or enables the exchange of PDUs between the UE 602 and the data network 636.

The UPF 648 may act as an anchor point for intra-RAT and inter-RAT mobility, an external PDU session point of interconnect to data network 636, and a branching point to support multi-homed PDU session. The UPF 648 may also perform packet routing and forwarding, perform packet inspection, enforce the user plane part of policy rules, lawfully intercept packets)UP collection), perform traffic usage reporting, perform QoS handling for a user plane (e.g., packet filtering, gating, UL/DL rate enforcement(, perform uplink traffic verification (e.g., SDF-to-QoS flow mapping(, transport level packet marking in the uplink and downlink, and perform downlink packet buffering and downlink data notification triggering. UPF 648 may include an uplink classifier to support routing traffic flows to a data network.

The NSSF 650 may select a set of network slice instances serving the UE 602. The NSSF 650 may also determine allowed NSSAI and the mapping to the subscribed S-NSSAIs, if needed. The NSSF 650 may also determine the AMF set to be used to serve the UE 602, or a list of candidate AMFs based on a suitable configuration and possibly by querying the NRF 654. The selection of a set of network slice instances for the UE 602 may be triggered by the AMF 644 with which the UE 602 is registered by interacting with the NSSF 650, which may lead to a change of AMF. The NSSF 650 may interact with the AMF 644 via an N22 reference point; and may communicate with another NSSF in a visited network via an N31 reference point (not shown). Additionally, the NSSF 650 may exhibit an Nnssf service-based interface.

The NEF 652 may securely expose services and capabilities provided by3GPP network functions for third party, internal exposure/re-exposure, AFs) e.g.,AF 660), edge computing or fog computing systems, etc. In such embodiments, the NEF 652 may authenticate, authorize, or throttle the AFs. NEF 652 may also translate information exchanged with the AF 660 and information exchanged with internal network functions. For example, the NEF 652 may translate between an AF-Service-Identifier and an internal 5GC information. NEF 652 may also receive information from other NFs based on exposed capabilities of other NFs. This information may be stored at the NEF 652 as structured data, or at a data storage NF using standardized interfaces. The stored information can then be re-exposed by the NEF 652 to other NFs and AFs, or used for other purposes such as analytics. Additionally, the NEF 652 may exhibit an Neff service-based interface.

The NRF 654 may support service discovery functions, receive NF discovery requests from NF instances, and provide the information of the discovered NF instances to the NF instances. NRF 654 also maintains information of available NF instances and their supported services. As used herein, the terms"instantiate," "instantiation," and the like may refer to the creation of an instance, and an "instance" may refer to a concrete occurrence of an object, which may occur, for example, during execution of program code. Additionally, the NRF 654 may exhibit the Nnrf service-based interface.

The PCF 656 may provide policy rules to control plane functions to enforce them, and may also support unified policy framework to govern network behavior. The PCF 656 may also implement a front end to access subscription information relevant for policy decisions in a UDR of the UDM 658. In addition to communicating with functions over reference points as shown, the PCF 656 exhibit an Npcf service-based interface.

The UDM 658 may handle subscription-related information to support the network entities' handling of communication sessions, and may store subscription data of UE 602. For example, subscription data may be communicated via an N8 reference point between the UDM 658 and the AMF 644. The UDM 658 may include two parts, an application front end and a UDR. The UDR may store subscription data and policy data for the UDM 658 and the PCF 656, and/or structured data for exposure and application data (including PFDs for application detection, application request information for multiple UEs 602) for the NEF 652. The Nudr service-based interface may be exhibited by the UDR 221 to allow the UDM 658, PCF 656, and NEF 652 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 658 may exhibit the Nudm service-based interface.

The AF 660 may provide application influence on traffic routing, provide access to NEF, and interact with the policy framework for policy control.

In some embodiments, the 5GC 640 may enable edge computing by selecting operator/3rd party services to be geographically close to a point that the UE 602 is attached to the network. This may reduce latency and load on the network. To provide edge-computing implementations, the 5GC 640 may select a UPF 648 close to the UE 602 and execute traffic steering from the UPF 648 to data network 636 via the N6 interface. This may be based on the UE subscription data, UE location, and information provided by the AF 660. In this way, the AF 660 may influence UPF (re)selection and traffic routing. Based on operator deployment, when AF 660 is considered to be a trusted entity, the network operator may permit AF 660 to interact directly with relevant NFs. Additionally, the AF 660 may exhibit an Naf service-based interface.

The data network 636 may represent various network operator services, Internet access, or third party services that may be provided by one or more servers including, for example, application/content server 638.

FIG. 7 schematically illustrates a wireless network 700 in accordance with various embodiments. The wireless network 700 may include a UE 702 in wireless communication with an AN 704. The UE 702 and AN 704 may be similar to, and substantially interchangeable with, like-named components described elsewhere herein.

The UE 702 may be communicatively coupled with the AN 704 via connection 706. The connection 706 is illustrated as an air interface to enable communicative coupling, and can be consistent with cellular communications protocols such as an LTE protocol or a 5G NR protocol operating at mmWave or sub-6 GHz frequencies.

The UE 702 may include a host platform 708 coupled with a modem platform 710. The host platform 708 may include application processing circuitry 712, which may be coupled with protocol processing circuitry 714 of the modem platform 710. The application processing circuitry 712 may run various applications for the UE 702 that source/sink application data. The application processing circuitry 712 may further implement one or more layer operations to transmit/receive application data to/from a data network. These layer operations may include transport (for example UDP) and Internet (for example, IP) operations The protocol processing circuitry 714 may implement one or more of layer operations to facilitate transmission or reception of data over the connection 706. The layer operations implemented by the protocol processing circuitry 714 may include, for example, MAC, RLC, PDCP, RRC and NAS operations.

The modem platform 710 may further include digital baseband circuitry 716 that may implement one or more layer operations that are "below" layer operations performed by the protocol processing circuitry 714 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 710 may further include transmit circuitry 718, receive circuitry 720, RF circuitry 722, and RF front end (RFFE) 724, which may include or connect to one or more antenna panels 726. Briefly, the transmit circuitry 718 may include a digital-to-analog converter, mixer, intermediate frequency (IF) components, etc.; the receive circuitry 720 may include an analog-to-digital converter, mixer, IF components, etc.; the RF circuitry 722 may include a low-noise amplifier, a power amplifier, power tracking components, etc.; RFFE 724 may include filters (for example, surface/bulk acoustic wave filters), switches, antenna tuners, beamforming components (for example, phase-array antenna components), etc. The selection and arrangement of the components of the transmit circuitry 718, receive circuitry 720, RF circuitry 722, RFFE 724, and antenna panels 726 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 714 may include one or more instances of control circuitry) not shown (to provide control functions for the transmit/receive components.

A UE reception may be established by and via the antenna panels 726, RFFE 724, RF circuitry 722, receive circuitry 720, digital baseband circuitry 716, and protocol processing circuitry 714. In some embodiments, the antenna panels 726 may receive a transmission from the AN 704 by receive-beamforming signals received by a plurality of antennas/antenna elements of the one or more antenna panels 726.

A UE transmission may be established by and via the protocol processing circuitry 714, digital baseband circuitry 716, transmit circuitry 718, RF circuitry 722, RFFE 724, and antenna panels 726. In some embodiments, the transmit components of the UE 704 may apply a spatial filter to the data to be transmitted to form a transmit beam emitted by the antenna elements of the antenna panels 726.

Similar to the UE 702, the AN 704 may include a host platform 728 coupled with a modem platform 730. The host platform 728 may include application processing circuitry 732 coupled with protocol processing circuitry 734 of the modem platform 730. The modem platform may further include digital baseband circuitry 736, transmit circuitry 738, receive circuitry 740, RF circuitry 742, RFFE circuitry 744, and antenna panels 746. The components of the AN 704 may be similar to and substantially interchangeable with like-named components of the UE 702. In addition to performing data transmission/reception as described above, the components of the AN 708 may perform various logical functions that include, for example, RNC functions such as radio bearer management, uplink and downlink dynamic radio resource management, and data packet scheduling.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840 or other interface circuitry. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processors 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface controllers, components, or other suitable devices to communicate with one or more peripheral devices 804 or one or more databases 806 or other network elements via a network 808. For example, the communication resources 830 may include wired communication components (e.g., for coupling via USB, Ethernet, etc.), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Procedures

Figure 9:
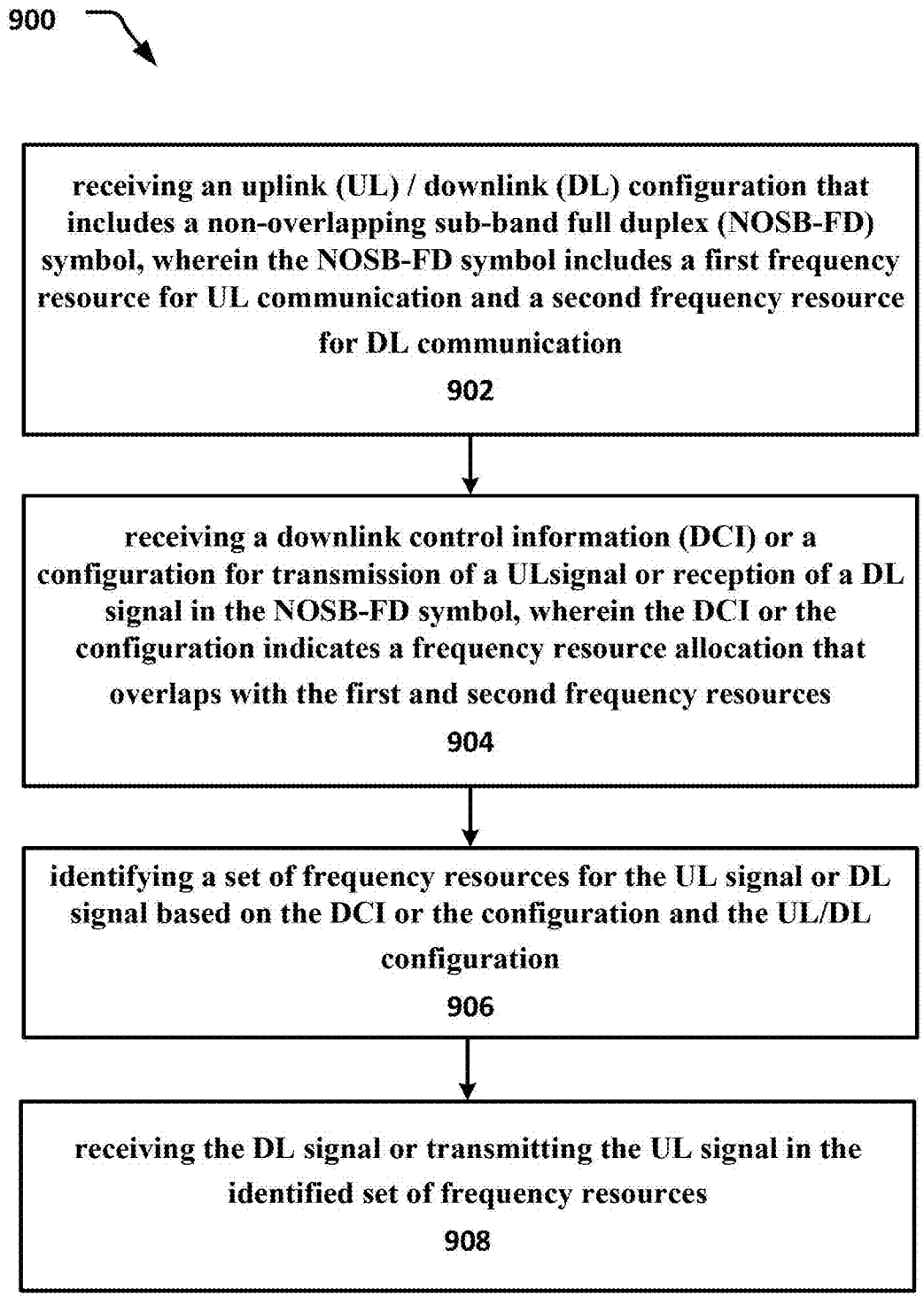
FIGS. 9, 10, and 11 depict example procedures for practicing the various embodiments discussed herein.

In some embodiments, the electronic device(s), network(s), system(s), chip(s) or component(s), or portions or implementations thereof, of FIGS. 6-8, or some other figure herein, may be configured to perform one or more processes, techniques, or methods as described herein, or portions thereof. One such process 900 is depicted in FIG. 9. The process 900 may be performed by a user equipment (UE), a portion thereof, and/or an electronic device that includes a UE. At 902, the process 900 may include receiving an uplink (UL)/downlink (DL) configuration that includes a non-overlapping sub-band full duplex (NOSB-FD) symbol, wherein the NOSB-FD symbol includes a first frequency resource for UL communication and a second frequency resource for DL communication. At 904, the process 900 may further include receiving a downlink control information (DCI) or a higher-layer configuration for transmission of a UL signal or reception of a DL signal in the NOSB-FD symbol, wherein the DCI or the higher-layer configuration indicates a frequency resource allocation that overlaps with the first and second frequency resources. The higher-layer configuration may be, e.g., for semi-persistent and/or periodic scheduling. At 906, the process 900 may further include identifying a set of frequency resources for the UL signal or DL signal based on the DCI or the higher-layer configuration and the UL/DL configuration. At 908, the process 900 may further include receiving the DL signal or transmitting the UL signal in the identified set of frequency resources.

Figure 10:
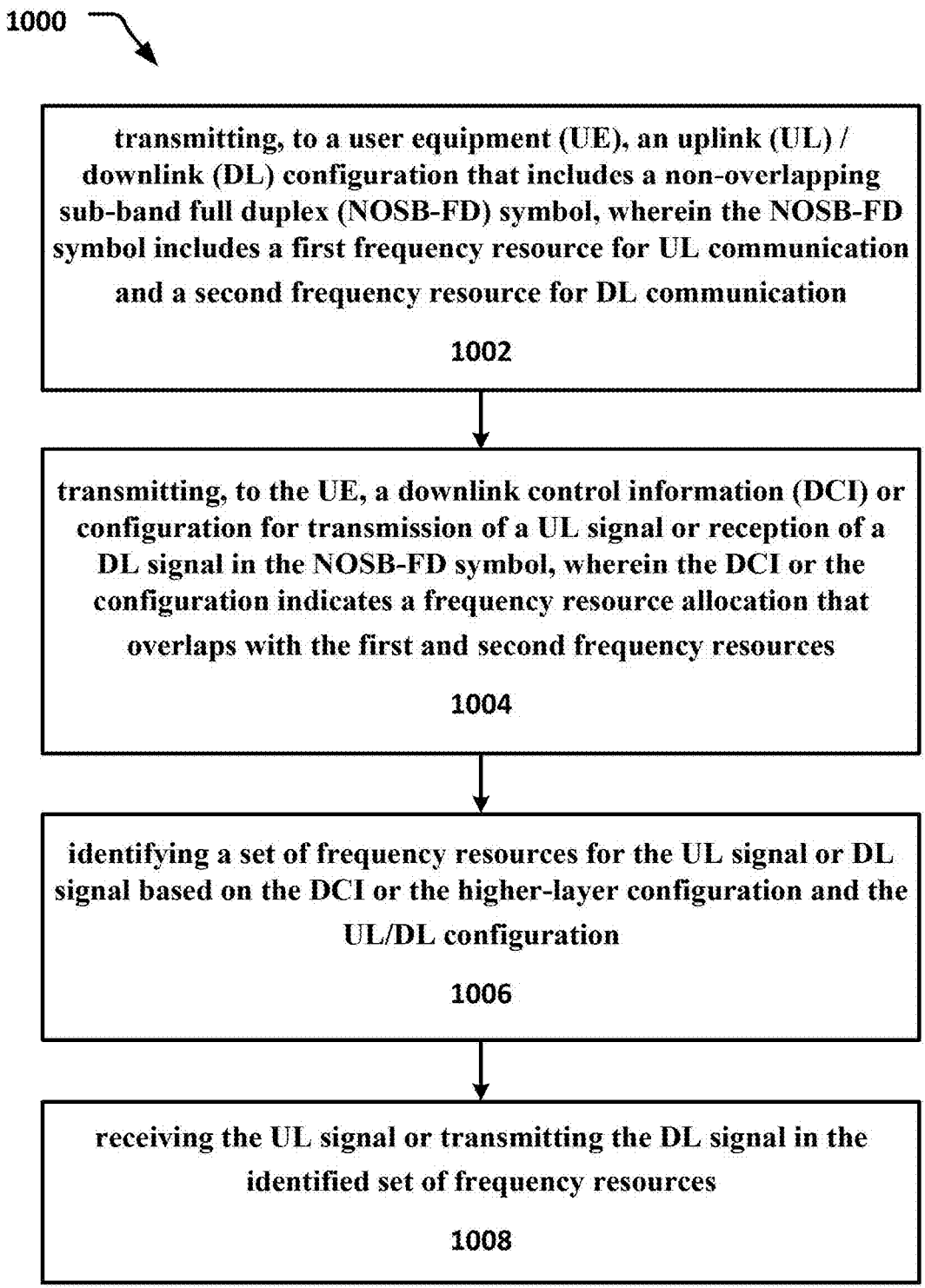

FIG. 10 illustrates another example process 1000 in accordance with various embodiments. The process 1000 may be performed by a base station, a portion thereof, and/or an electronic device that includes a base station. At 1002, the process 1000 may include transmitting, to a user equipment (UE), an uplink (UL)/downlink (DL) configuration that includes a non-overlapping sub-band full duplex (NOSB-FD) symbol, wherein the NOSB-FD symbol includes a first frequency resource for UL and a second frequency resource for DL. At 1004, the process 1000 may further include transmitting, to the UE, a downlink control information (DCI) or higher-layer configuration for transmission of a UL signal or reception of a DL signal in the NOSB-FD symbol, wherein the DCI or the higher-layer configuration indicates a frequency resource allocation that overlaps with the first and second frequency resources. At 1006, the process 1000 may further include identifying a set of frequency resources for the UL signal or DL signal based on the DCI or the higher-layer configuration and the UL/DL configuration. At 1008, the process 1000 may further include receiving the UL signal or transmitting the DL signal in the identified set of frequency resources.

Figure 11:
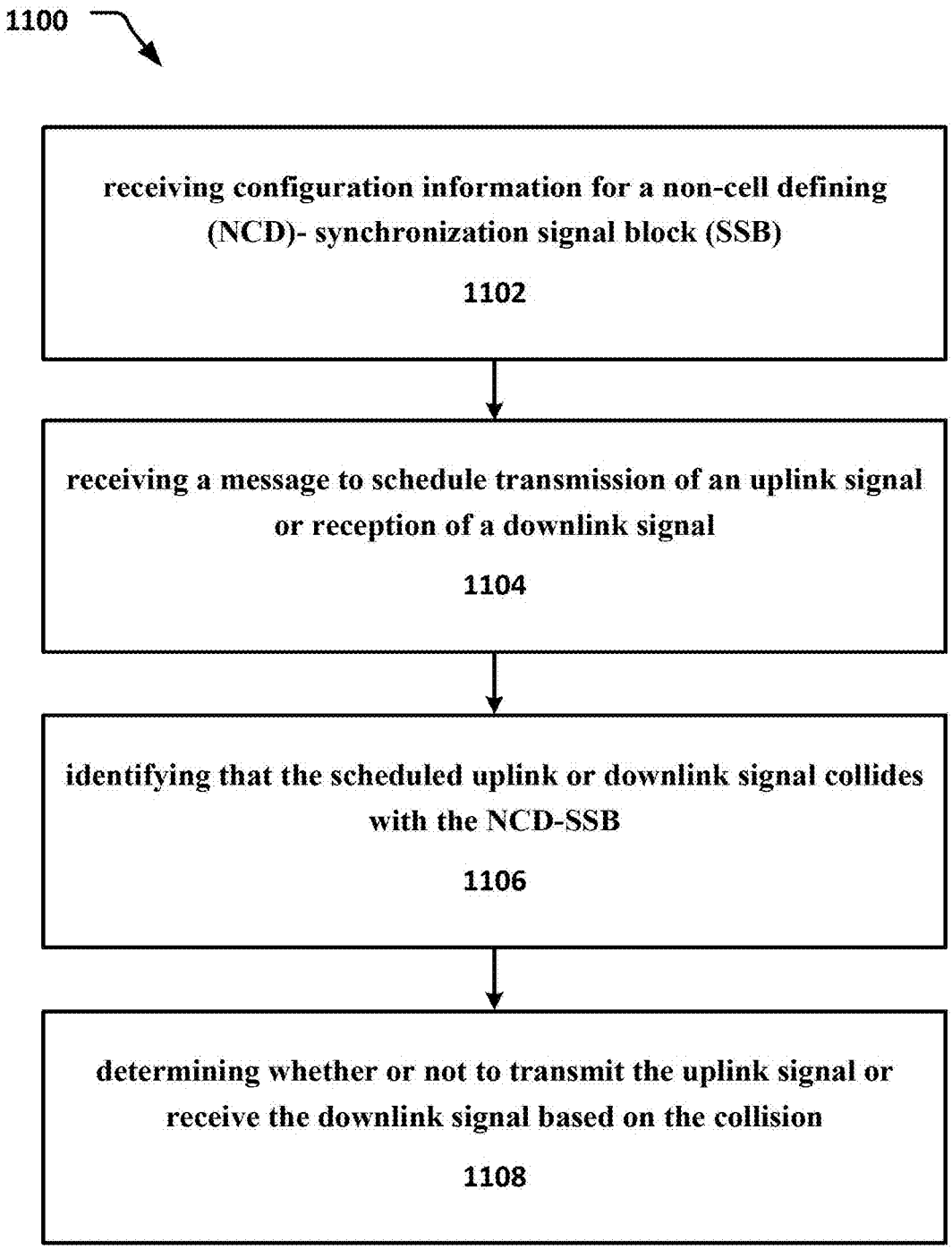

FIG. 11 illustrates another example process 1100 in accordance with various embodiments. The process 1100 may be performed by a user equipment (UE), a portion thereof, and/or an electronic device that includes a UE. At 1102, the process 1100 may include receiving configuration information for a non-cell defining (NCD)-synchronization signal block (SSB). At 1104, the process 1100 may further include receiving a message to schedule transmission of an uplink signal or reception of a downlink signal. At 1106, the process 1100 may further include identifying that the scheduled uplink signal or downlink signal collides with the NCD-SSB. At 1108, the process 1100 may further include determining whether or not to transmit the uplink signal or receive the downlink signal based on the collision.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example A1 may include a method of wireless communication to handle collisions between non-cell defining (NCD)-synchronization signal block (SSB) and UL transmission in NR, the method comprising: receiving, by a UE, a high layer configuration to configure NCD-SSB; detecting, by the UE, a downlink control information (DCI) that is used schedule an uplink transmission and/or detecting a high layer configuration to configure an uplink transmission; and determining, by the UE, how to handle collision between the uplink transmission and the NCD-SSB.

Example A2 may include the method of example A1 or some other example herein, wherein if a semi-statically configured or dynamically scheduled UL transmission is collided with a NCD-SSB and/or CD-SSB, the NCD-SSB and/or CD-SSB is prioritized and the UL transmission is canceled.

Example A3 may include the method of example A1 or some other example herein, wherein if a valid RO or valid MsgA PUSCH triggered by higher layers is collided with an NCD-SSB, it is up to UE implementation whether to receive NCD-SSB or transmit PRACH.

Example A4 may include the method of example A1 or some other example herein, when SSB is not present in a separate initial DL BWP or RRC-configured active DL BWP, if a semi-statically configured or dynamically scheduled UL transmission is collided with a CD-SSB that is not configured in the separate initial DL BWP or RRC-configured active DL BWP, the UL transmission is canceled.

Example A5 may include the method of example A4 or some other example herein, wherein in unpaired spectrum, a RedCap UE expects to cancel an UL transmission if the UL transmission overlaps with a CD-SSB, irrespective of whether the CD-SSB is included within the separate initial DL BWP or not.

Example A6 may include the method of example A4 or some other example herein, wherein in unpaired spectrum, a RedCap UE, configured with Type 1 PDCCH-CSS for random access in separate initial DL BWP which does not include a CD-SSB, does not expect to be scheduled with a PUSCH for Msg3 or a PUCCH with HARQ-ACK in response to Msg4 PDSCH that overlaps in at least one symbol with the CD-SSB.

Example A7 may include the method of example A1 or some other example herein, when NCD-SSB is present in an RRC-configured active DL BWP, for PUSCH repetition type A with counting based on available slot, and TBoMS for a UE, a slot is not counted in the number of N·K slots for PUSCH transmission if at least one of the symbols indicated by the indexed row of the used resource allocation table in the slot overlaps with a symbol of an SS/PBCH block for NCD-SSB and/or CD-SSB.

Example A8 may include the method of example A1 or some other example herein, when NCD-SSB is present in an RRC-configured active DL BWP, for PUCCH repetitions for a UE, UE determines a slot available for PUCCH repetition if a repetition of the PUCCH transmission does not include a symbol indicated as a symbol of an SS/PBCH block for NCD-SSB and/or CD-SSB.

Example A9 may include the method of example A1 or some other example herein, wherein Validation of PRACH occasions and MsgA PUSCH occasions is based on NCD-SSB and/or CD-SSB.

Example A10 may include the method of example A1 or some other example herein, wherein validation of CG-PUSCH occasion for CG-SDT operation is based on NCD-SSB and/or CD-SSB.

Example A11 may include the method of example A1 or some other example herein, wherein when NCD-SSB is present in an RRC-configured active DL BWP, for PUSCH repetition type A with counting based on available slot, and TBoMS for HD-FDD RedCap UEs, a UE determines a slot as an available slot when a PUSCH or TBoMS transmission starts or ends at least $N_{Rx\text{-}Tx} \cdot T_c$, or $N_{Tx\text{-}Rx} \cdot T_c$, respectively, from the last or first symbol in the set of symbols for NCD-SSB and/or CD-SSB and does not overlap with NCD-SSB and/or CD-SSB transmission.

Example A12 may include the method of example A1 or some other example herein, when NCD-SSB is present in an RRC-configured active DL BWP, for HD-FDD RedCap UEs, symbols that are not at least $N_{Rx\text{-}Tx} \cdot T_c$, before the first symbol or not at least $N_{Rx\text{-}Tx} \cdot T_c$, after the last symbol indicated for an NCD-SSB and/or CD-SSB are considered as invalid symbols for PUSCH repetition Type B transmission.

Example A13 may include the method of example A1 or some other example herein, when NCD-SSB is present in an RRC-configured active DL BWP, for monitoring of a PDCCH candidate by a UE, if the UE has received ssb-PositionsInBurst for NCD-SSB for a serving cell, and at least one RE for a PDCCH candidate overlaps with at least one RE of a candidate SS/PBCH block corresponding to a SS/PBCH block index provided by ssb-PositionsInBurst for NCD-SSB with same physical cell identity as the one associated with a RS having same quasi-collocation properties as a CORESET for the PDCCH candidate, the UE is not required to monitor the PDCCH candidate.

Example A14 may include the method of example A1 or some other example herein, when NCD-SSB is present in an RRC-configured active DL BWP, the UE assumes SS/PBCH block transmission for NCD-SSB and/or CD-SSB if the PDSCH resource allocation overlaps with PRBs containing SS/PBCH block transmission resources, the UE shall assume that the PRBs containing SS/PBCH block transmission resources are not available for PDSCH in the OFDM symbols where SS/PBCH block is transmitted for NCD-SSB and/or CD-SSB.

Example A15 may include the method of example A1 or some other example herein, wherein for BWP #0 configuration option 1, in RRC connected mode, if a RedCap UE is configured with an RRC-configured DL BWP that is provided with an NCD-SSB configuration such that the NCD-SSB is included within the bandwidth of a separate initial DL BWP, the UE may assume presence of NCD-SSB when the separate initial DL BWP is the active DL BWP.

Example A16 may include the method of example A1 or some other example herein, wherein for BWP #0 configuration option 1, a RedCap UE may be configured with a separate initial DL BWP that does not include the CD-SSB with Type 1 PDCCH CSS (without Type 2 PDCCH CSS configuration) configured in the separate initial DL BWP, and in this case, the UE may expect to be provided with at least the configuration of an RRC-configured DL BWP in BWP-DownlinkDedicated that includes a configuration of NCD-SSB such that the NCD-SSB is included within the bandwidth of the separate initial DL BWP.

Example A17 may include a method of a UE, the method comprising: receiving configuration information for a non-cell defining (NCD)-synchronization signal block (SSB); receiving a message to schedule an uplink transmission; identifying that the uplink transmission collides with the NCD-SSB; and determining whether or not to transmit the uplink transmission based on the collision.

Example A18 may include the method of example A17 or some other example herein, wherein if the uplink transmission is semi-statically configured or dynamically scheduled, then the UL transmission is canceled and the method further comprises decoding the NCD-SSB.

Example A19 may include the method of example A17-A18 or some other example herein, wherein the UE is a reduced capability (RedCap) UE.

Example B1 may include a method of DL reception and UL transmission in full duplex system, the method comprising: configuring, by a gNB, UL and DL resource within the serving cell or BWP bandwidth for different symbols; receiving, by a UE, the UL and DL resource configuration; receiving, by a UE, the UL/DL signals configuration, and/or the DCI scheduling the UL/DL signals; and determining, by a UE, to transmit UL or receive DL.

Example B2 may include the method of example B1 or some other example herein, where the UL and DL resource configuration may be explicitly indicated or implicitly determined based on type of symbol being DL or UL or "Full Duplex symbol" and includes full UL in a symbol, full DL in a symbol, and UL and DL sub-band within the same symbol.

Example B3 may include the method of example B1 and/or example B2 or some other example herein, where the UL determined by the UE to transmit is confined to within the frequency resources defined by the UL sub-band.

Example B4 may include the method of example B1 and/or example B2 or some other example herein, where the DL determined by the UE to receive is confined to within the DL sub-band, or at least the dynamically scheduled DL channel/signal may overlap with UL sub-band.

Example B5 may include the method of example B1 and/or example B2 or some other example herein, where the UL or DL determined by the UE to receive does not overlap with the guard band between DL and UL sub-band.

Example B6 may include the method of example B4 or some other example herein, where the frequency resource of DL/UL determined by the UE to receive/transmit is determined by FDRA based on active BWP bandwidth or based on active BWP and sub-band and/or guard band information, or based on active BWP and sub-band indication for rate matching.

Example B7 may include the method of example B6 or some other example herein, wherein if the DL determined by the UE to receive is PDCCH, UE drops PDCCH candidate reception, if the frequency resource of the PDCCH candidate overlaps with the UL sub-band, or UE assumes a set of RBGs associated with a CCE with PRBs overlapping with the UL sub-band is rate matched/not transmitted/punctured, or UE assumes a REG or a PRB overlapping with the UL sub-band is rate matched/not transmitted/punctured.

Example B8 may include the method of example B6 or some other example herein, where the frequency resource of UL determined by the UE to transmit is further determined by whether transform precoding is enabled, or π/2-BPSK is enabled.

Example B9 may include the method of example B6 or some other example herein, wherein UE does not expect a DL/UL signal/channel occupying a set of symbols wherein some symbols contains both UL and DL sub-band while other symbols are legacy DL/UL/Flexible symbol.

Example B10 may include the method of example B6 or some other example herein, where the frequency resource of DL/UL determined by the UE to receive/transmit is determined by FDRA based on active BWP and sub-band and/or guard band information, the frequency domain resource indicated by DCI or configured by higher layer is interpreted based on sub-band configuration, if at least one symbol is NOSB-FD symbol while another symbol is full DL/UL/Flexible symbol.

Example B11 may include the method of example B6 or some other example herein, where the frequency resource of DL/UL determined by the UE to receive/transmit is determined by FDRA based on active BWP and sub-band and/or guard band information, the frequency domain resource indicated by DCI or configured by higher layer is interpreted based on the interaction of sub-band configuration and active BWP, if at least one symbol is NOSB-FD symbol while another symbol is full DL/UL/Flexible symbol.

Example B12 includes a method to be performed by a user equipment (UE), the method comprising: identifying that a symbol is a full duplex symbol that includes a resource for uplink transmission and a resource for downlink transmission; transmitting the uplink transmission on the resource for uplink transmission; and identifying the downlink transmission on the resource for downlink transmission.

Example B13 includes the method of example B12, and/or some other example herein, wherein the symbol is a non-overlapping sub-band full duplex (NOSB-FD) symbol.

Example B14 includes the method of any of examples B12-B13, and/or some other example herein, wherein identifying that the symbol is a full duplex symbol is based on an indication received from a base station.

Example B15 includes the method of example B14, and/or some other example herein, wherein the indication is received in radio resource control (RRC) signaling, system information (SI), or downlink control information (DCI).

Example B16 includes the method of example B14, and/or some other example herein, wherein the indication is received in sub-band configuration information.

Example B17 includes the method of any of examples B12-B13, and/or some other example herein, wherein the identification that the symbol is a full duplex symbol is implicit.

Example B18 includes a method to be performed by a base station, the method comprising: identifying that a symbol is a full duplex symbol that includes a resource for uplink transmission and a resource for downlink transmission; identifying the uplink transmission on the resource for uplink transmission; and transmitting the downlink transmission on the resource for downlink transmission.

Example B19 includes the method of example B18, and/or some other example herein, wherein the symbol is a non-overlapping sub-band full duplex (NOSB-FD) symbol.

Example B20 includes the method of any of examples B18-B19, and/or some other example herein, further comprising transmitting, by the base station, an indication that the symbol is a full duplex symbol.

Example B21 includes the method of example B20, and/or some other example herein, wherein the indication is transmitted in radio resource control (RRC) signaling, system information (SI), or downlink control information (DCI).

Example B22 includes the method of example B20, and/or some other example herein, wherein the indication is transmitted in sub-band configuration information.

Example C1 includes one or more non-transitory computer-readable media (NTCRM) having instructions, stored thereon, that when executed by one or more processors of a user equipment (UE) configure the UE to: receive an uplink (UL)/downlink (DL) configuration that includes a non-overlapping sub-band full duplex (NOSB-FD) symbol, wherein the NOSB-FD symbol includes a first frequency resource for UL communication and a second frequency resource for DL communication; receive a downlink control information (DCI) or a higher-layer configuration for transmission of a UL signal or reception of a DL signal in the NOSB-FD symbol, wherein the DCI or the higher-layer configuration indicates a frequency resource allocation that overlaps with the first and second frequency resources; identify a set of frequency resources for the UL signal or DL signal based on the DCI or the higher-layer configuration and the UL/DL configuration; and receive the DL signal or transmit the UL signal in the identified set of frequency resources.

Example C2 includes the one or more NTCRM of example C1, wherein the frequency resource allocation indicated by the DCI or the higher-layer configuration is with reference to a sub-band determined by the UL/DL configuration or with reference to an active bandwidth part (BWP).

Example C3 includes the one or more NTCRM of example C2, wherein the identified set of frequency resources corresponds to the entire frequency resource allocation indicated by the DCI or the configuration.

Example C4 includes the one or more NTCRM of example C2, wherein, for the DL transmission, the identified set of frequency resources excludes the portion of the frequency resource allocation that overlaps with the first frequency resource; and wherein, for the UL transmission, the identified set of frequency resources excludes the portion of the frequency resource allocation that overlaps with the second frequency resource.

Example C5 includes the one or more NTCRM of example C4, wherein the UL signal or DL signal is entirely canceled, rate matched around the excluded portion, or mapped to physical resources but not transmitted in the excluded portion.

Example C6 includes the one or more non-transitory computer-readable media (NTCRM) having instructions, stored thereon, that when executed by one or more processors of a next generation Node B (gNB) configure the gNB to: transmit, to a user equipment (UE), an uplink (UL)/downlink (DL) configuration that includes a non-overlapping sub-band full duplex (NOSB-FD) symbol, wherein the NOSB-FD symbol includes a first frequency resource for UL and a second frequency resource for DL; transmit, to the UE, a downlink control information (DCI) or higher-layer configuration for transmission of a UL signal or reception of a DL signal in the NOSB-FD symbol, wherein the DCI or the higher-layer configuration indicates a frequency resource allocation that overlaps with the first and second frequency resources; identify a set of frequency resources for the UL signal or DL signal based on the DCI or the higher-layer configuration and the UL/DL configuration; and receive the UL signal or transmit the DL signal in the identified set of frequency resources.

Example C7 includes the one or more NTCRM of example C6, wherein the frequency resource allocation indicated by the DCI or the higher-layer configuration is provided with reference to a sub-band determined by the UL/DL configuration or with reference to an active bandwidth part (BWP).

Example C8 includes the one or more NTCRM of example C7, wherein the identified set of frequency resources corresponds to the entire frequency resource allocation indicated by the DCI or the higher-layer configuration.

Example C9 includes the one or more NTCRM of example C7, wherein, for the DL signal, the identified set of frequency resources excludes the portion of the frequency resource allocation that overlaps with the first frequency resource; and wherein, for the UL signal, the identified set of frequency resources excludes the portion of the frequency resource allocation that overlaps with the second frequency resource.

Example C10 includes the one or more NTCRM of example C9, wherein the UL signal or the DL signal is entirely canceled, rate matched around the excluded portion, or mapped to physical resources but not transmitted in in the excluded portion.

Example C11 includes an apparatus to be implemented in a user equipment (UE), the apparatus comprising: a memory to store configuration information for a non-cell defining (NCD)-synchronization signal block (SSB); and processor circuitry coupled to the memory. The processor circuitry is to: receive a message to schedule an uplink signal or downlink signal; identify that the scheduled uplink signal or downlink signal collides with the NCD-SSB; and determine whether or not to transmit the uplink signal or receive the downlink signal based on the collision.

Example C12 includes the apparatus of example C11, wherein, if the transmission of the uplink signal is semi-statically configured or dynamically scheduled, then the transmission of the uplink signal is canceled.

Example C13 includes the apparatus of example C11, wherein, if the uplink signal corresponds to a valid physical random access channel (PRACH) occasion or valid MsgA PUSCH occasion triggered by higher layers, the determination of whether or not to transmit the PRACH occasion or MsgA PUSCH is based on a UE implementation.

Example C14 includes the apparatus of example C11, wherein the processor circuitry is further to count available slots for physical uplink shared channel (PUSCH) repetition type A or a transport block (TB) processing over multiple slot (TBoMS) PUSCH based on whether corresponding PUSCH resources overlap with symbols of the NCD-SSB.

Example C15 includes the apparatus of example C14, wherein, the processor circuitry is further to determine a slot as an available slot when a PUSCH or TBoMS transmission starts or ends at least $N_{Rx\text{-}Tx} \cdot T_c$, or $N_{Tx\text{-}Rx} \cdot T_c$, respectively, from a last or first symbol in a set of symbols for the NCD-SSB and does not overlap with the NCD-SSB.

Example C16 includes the apparatus of example C11, wherein, for the uplink signal corresponds to a PUSCH repetition Type B transmission, and wherein the processor circuitry is further to determine that symbols that are not at least $N_{Rx\text{-}Tx} \cdot T_c$, Before a First Symbol or not at least $N_{Rx\text{-}Tx} \cdot T_c$, after a last symbol indicated for the NCD-SSB as invalid symbols for the PUSCH repetition Type B transmission.

Example C17 includes the apparatus of example C11, wherein the processor circuitry is further to validate, based on the NCD-SSB, physical random access channel (PRACH) occasions, MsgA physical uplink shared channel (PUSCH) occasions when configured by higher layers, and configured grant (CG)-PUSCH occasions for CG-small data transmission (SDT) operation when configured by higher layers.

Example C18 includes the apparatus of example C11, wherein, if at least one resource element (RE) for a physical downlink control channel (PDCCH) candidate overlaps with at least one RE for the NCD-SSB, the UE is not required to monitor the PDCCH candidate.

Example C19 includes the apparatus of example C11, wherein the processor circuitry is to assume a synchronization signal/physical broadcast channel (SS/PBCH) block transmission for the NCD-SSB if a physical downlink shared channel (PDSCH) resource allocation overlaps with physical resource blocks (PRBs) containing SS/PBCH block transmission resources, and the processor circuitry is to assume that the PRBs containing SS/PBCH block transmission resources are not available for a PDSCH in symbols where the SS/PBCH block is transmitted.

Example C20 includes the apparatus of any of examples C11-C20, wherein the UE is a reduced capability (RedCap) UE.

Example Z01 may include an apparatus comprising means to perform one or more elements of a method described in or related to any of examples A1-A19, B1-B22, C1-C20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A19, B1-B22, C1-C20, or any other method or process described herein.

Example Z03 may include an apparatus comprising logic, modules, or circuitry to perform one or more elements of a method described in or related to any of examples A1-A19, B1-B22, C1-C20, or any other method or process described herein.

Example Z04 may include a method, technique, or process as described in or related to any of examples A1-A19, B1-B22, C1-C20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A19, B1-B22, C1-C20, or portions thereof.

Example Z06 may include a signal as described in or related to any of examples A1-A19, B1-B22, C1-C20, or portions or parts thereof.

Example Z07 may include a datagram, packet, frame, segment, protocol data unit (PDU), or message as described in or related to any of examples A1-A19, B1-B22, C1-C20, or portions or parts thereof, or otherwise described in the present disclosure.

Example Z08 may include a signal encoded with data as described in or related to any of examples A1-A19, B1-B22, C1-C20, or portions or parts thereof, or otherwise described in the present disclosure.

Example Z09 may include a signal encoded with a datagram, packet, frame, segment, protocol data unit (PDU), or message as described in or related to any of examples A1-A19, B1-B22, C1-C20, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A19, B1-B22, C1-C20, or portions thereof.

Example Z11 may include a computer program comprising instructions, wherein execution of the program by a processing element is to cause the processing element to carry out the method, techniques, or process as described in or related to any of examples A1-A19, B1-B22, C1-C20, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | | |
|---|---|---|
| 3GPP Third Generation Partnership Project | API Application Programming Interface | BS Base Station BSR Buffer Status |
| 4G Fourth Generation | APN Access Point Name | Report |
| 5G Fifth Generation | ARP Allocation and | BW Bandwidth |
| 5GC 5G Core network | Retention Priority | BWP Bandwidth Part |
| AC Application Client | ARQ Automatic Repeat Request | C-RNTI Cell Radio Network Temporary |
| ACR Application Context Relocation | AS Access Stratum ASP Application | Identity CA Carrier |
| ACK Acknowledgement | Service Provider | Aggregation, |
| ACID Application Client Identification | ASN.1 Abstract Syntax Notation One | Certification Authority |
| AF Application Function | AUSF Authentication Server Function | CAPEX CAPital Expenditure |
| AM Acknowledged | AWGN Additive | CBRA Contention Based |

-continued

| | | |
|---|---|---|
| Mode | White Gaussian | Random Access |
| AMBR Aggregate | Noise | CC Component Carrier, |
| Maximum Bit Rate | BAP Backhaul | Country Code, |
| AMF Access and | Adaptation Protocol | Cryptographic |
| Mobility | BCH Broadcast Channel | Checksum |
| Management | BER Bit Error Ratio | CCA Clear Channel |
| Function | BFD Beam Failure | Assessment |
| AN Access Network | Detection | CCE Control Channel |
| ANR Automatic | BLER Block Error Rate | Element |
| Neighbour Relation | BPSK Binary Phase Shift | CCCH Common Control |
| AOA Angle of | Keying | Channel |
| Arrival | BRAS Broadband Remote | CE Coverage |
| AP Application | Access Server | Enhancement |
| Protocol, Antenna | BSS Business Support | CDM Content Delivery |
| Port, Access Point | System | Network |
| CDMA Code- | CO Conditional | CRC Cyclic Redundancy |
| Division Multiple | Optional | Check |
| Access | CoMP Coordinated Multi- | CRI Channel-State |
| CDR Charging Data | Point | Information Resource |
| Request | CORESET Control | Indicator, CSI-RS |
| CDR Charging Data | Resource Set | Resource Indicator |
| Response | COTS Commercial Off- | C-RNTI Cell RNTI |
| CFRA Contention Free | The-Shelf | CS Circuit Switched |
| Random Access | CP Control Plane, | CSCF call session |
| CG Cell Group | Cyclic Prefix, Connection | control function |
| CGF Charging | Point | CSAR Cloud Service |
| Gateway Function | CPD Connection Point | Archive |
| CHF Charging | Descriptor | CSI Channel-State |
| Function | CPE Customer Premise | Information |
| CI Cell Identity | Equipment | CSI-IM CSI |
| CID Cell-ID (e.g., | CPICHCommon Pilot | Interference |
| positioning method) | Channel | Measurement |
| CIM Common | CQI Channel Quality | CSI-RS CSI |
| Information Model | Indicator | Reference Signal |
| CIR Carrier to | CPU CSI processing | CSI-RSRP CSI |
| Interference Ratio | unit, Central Processing | reference signal |
| CK Cipher Key | Unit | received power |
| CM Connection | C/R | CSI-RSRQ CSI |
| Management, Conditional | Command/Response | reference signal |
| Mandatory | field bit | received quality |
| CMAS Commercial | CRAN Cloud Radio | CSI-SINR CSI signal- |
| Mobile Alert Service | Access Network, | to-noise and interference |
| CMD Command | Cloud RAN | ratio |
| CMS Cloud Management | CRB Common Resource | CSMA Carrier Sense |
| System | Block | Multiple Access |
| CSMA/CA CSMA with | DRB Data Radio Bearer | EASID Edge |
| collision avoidance | DRS Discovery | Application Server |
| CSS Common Search | Reference Signal | Identification |
| Space, Cell-specific | DRX Discontinuous | ECS Edge |
| Search Space | Reception | Configuration Server |
| CTF Charging | DSL Domain Specific | ECSP Edge |
| Trigger Function | Language. Digital | Computing Service |
| CTS Clear-to-Send | Subscriber Line | Provider |
| CW Codeword | DSLAM DSL Access | EDN Edge Data |
| CWS Contention | Multiplexer | Network |
| Window Size | DwPTS Downlink | EEC Edge |
| D2D Device-to-Device | Pilot Time Slot | Enabler Client |
| DC Dual Connectivity, | E-LAN Ethernet | EECID Edge |
| Direct Current | Local Area Network | Enabler Client |
| DCI Downlink Control | E2E End-to-End | Identification |
| Information | EAS Edge Application | EES Edge |
| DF Deployment | Server | Enabler Server |
| Flavour | ECCA extended clear | EESID Edge |
| DL Downlink | channel assessment, | Enabler Server |
| DMTF Distributed | extended CCA | Identification |
| Management Task Force | ECCE Enhanced Control | EHE Edge |
| DPDK Data Plane | Channel Element, | Hosting Environment |
| Development Kit | Enhanced CCE | EGMF Exposure |
| DM-RS, DMRS | ED Energy Detection | Governance |
| Demodulation | EDGE Enhanced Datarates | Management |
| Reference Signal | for GSM Evolution | Function |
| DN Data network | (GSM Evolution) | EGPRS Enhanced |
| DNN Data Network | EAS Edge | GPRS |
| Name | Application Server | EIR Equipment Identity |
| DNAI Data Network | ETWS Earthquake and | Register |
| Access Identifier | Tsunami Warning | FBI Feedback |
| eLAA enhanced Licensed | System | Information |
| AssistedAccess, | eUICC embedded UICC, | FCC Federal |
| enhanced LAA | embedded Universal | Communications |

| | | |
|---|---|---|
| EM Element Manager | Integrated Circuit Card | Commission |
| eMBB Enhanced Mobile Broadband | E-UTRA Evolved UTRA | FCCH Frequency Correction CHannel |
| EMS Element Management System | E-UTRAN Evolved UTRAN | FDD Frequency Division Duplex |
| eNB evolved NodeB, E-UTRAN Node B | EV2X Enhanced V2X F1AP F1 Application | FDM Frequency Division Multiplex |
| EN-DC E-UTRA-NR Dual Connectivity | Protocol F1-C F1 Control plane interface | FDMA Frequency Division Multiple Access FE Front End |
| EPC Evolved Packet Core | F1-U F1 User plane interface | FEC Forward Error Correction |
| EPDCCH enhanced PDCCH, enhanced Physical Downlink Control Cannel | FACCH Fast Associated Control CHannel FACCH/F Fast | FFS For Further Study FFT Fast Fourier Transformation feLAA further enhanced |
| EPRE Energy per resource element | Associated Control Channel/Full rate | Licensed Assisted Access, further |
| EPS Evolved Packet System | FACCH/H Fast Associated Control | enhanced LAA FN Frame Number |
| EREG enhanced REG, enhanced resource element groups | Channel/Half rate FACH Forward Access Channel | FPGA Field-Programmable Gate Array |
| ETSI European Telecommunications Standards Institute | FAUSCH Fast Uplink Signalling Channel FB Functional Block | FR Frequency Range FQDN Fully Qualified Domain Name |
| G-RNTI GERAN Radio Network Temporary Identity | GPSI Generic Public Subscription Identifier | HPLMN Home Public Land Mobile Network |
| GERAN GSM EDGE RAN, GSM EDGE Radio Access Network | GSM Global System for Mobile Communications, Groupe Spécial | HSDPA High Speed Downlink Packet Access HSN Hopping Sequence |
| GGSN Gateway GPRS Support Node GLONASS | Mobile GTP GPRS Tunneling Protocol | Number HSPA High Speed Packet Access |
| GLObal'naya NAvigatsionnaya Sputnikovaya Sistema (Engl.: Global Navigation Satellite System) | GTP-UGPRS Tunnelling Protocol for User Plane GTS Go To Sleep Signal (related to WUS) GUMMEI Globally | HSS Home Subscriber Server HSUPA High Speed Uplink Packet Access HTTP Hyper Text Transfer Protocol |
| gNB Next Generation NodeB gNB-CU gNB-centralized unit, Next Generation NodeB centralized unit | Unique MME Identifier GUTI Globally Unique Temporary UE Identity HARQ Hybrid ARQ, Hybrid Automatic Repeat Request | HTTPS Hyper Text Transfer Protocol Secure (https is http/1.1 over SSL, i.e. port 443) I-Block Information |
| gNB-DU gNB-distributed unit, Next Generation NodeB distributed unit | HANDO Handover HFN HyperFrame Number HHO Hard Handover | Block ICCID Integrated Circuit Card Identification IAB Integrated Access |
| GNSS Global Navigation Satellite System GPRS General Packet Radio Service | HLR Home Location Register HN Home Network HO Handover | and Backhaul ICIC Inter-Cell Interference Coordination |
| IDFT Inverse Discrete Fourier Transform IE Information element | IMPI IP Multimedia Private Identity IMPU IP Multimedia PUblic identity | ID Identity, identifier ISO International Organisation for Standardisation |
| IBE In-Band Emission IEEE Institute of Electrical and Electronics Engineers | IMS IP Multimedia Subsystem IMSI International Mobile Subscriber | ISP Internet Service Provider IWF Interworking-Function |
| IEI Information Element Identifier | Identity IoT Internet of Things | I-WLAN Interworking- |
| IEIDL Information Element Identifier Data Length | IP Internet Protocol Ipsec IP Security, Internet Protocol | WLAN Constraint length of the convolutional code, |
| IETF Internet Engineering Task Force | Security IP-CAN IP-Connectivity Access | USIM Individual key kB Kilobyte (1000 bytes) |
| IF Infrastructure IIOT Industrial Internet of Things | Network IP-M IP Multicast IPv4 Internet Protocol | kbps kilo-bits per second Kc Ciphering key Ki Individual |
| IM Interference Measurement, Intermodulation, IP Multimedia | Version 4 IPv6 Internet Protocol Version 6 IR Infrared | subscriber authentication key KPI Key Performance Indicator |

-continued

| | | |
|---|---|---|
| IMC IMS Credentials | IS In Sync | KQI Key Quality |
| IMEI International | IRP Integration | Indicator |
| Mobile Equipment | Reference Point | KSI Key Set Identifier |
| Identity | ISDN Integrated Services | ksps kilo-symbols per |
| IMGI International | Digital Network | second |
| mobile group identity | ISIM IM Services | KVM Kernel Virtual |
| L1-RSRP Layer 1 | Identity Module | Machine |
| reference signal | LPP LTE Positioning | L1 Layer 1 (physical |
| received power | Protocol | layer) |
| L2 Layer 2 (data link | LSB Least Significant | MANO |
| layer) | Bit | Management and |
| L3 Layer 3 (network | LTE Long Term | Orchestration |
| layer) | Evolution | MBMS Multimedia |
| LAA Licensed Assisted | LWA LTE-WLAN | Broadcast and Multicast |
| Access | aggregation | Service |
| LAN Local Area | LWIP LTE/WLAN Radio | MBSFN Multimedia |
| Network | Level Integration with | Broadcast multicast |
| LADN Local Area | IPsec Tunnel | service Single Frequency |
| Data Network | LTE Long Term | Network |
| LBT Listen Before Talk | Evolution | MCC Mobile Country |
| LCM LifeCycle | M2M Machine-to- | Code |
| Management | Machine | MCG Master Cell Group |
| LCR Low Chip Rate | MAC Medium Access | MCOT Maximum Channel |
| LCS Location Services | Control (protocol | Occupancy Time |
| LCID Logical | layering context) | MCS Modulation and |
| Channel ID | MAC Message | coding scheme |
| LI Layer Indicator | authentication code | MDAFManagement Data |
| LLC Logical Link | (security/encryption | Analytics Function |
| Control, Low Layer | context) | MDASManagement Data |
| Compatibility | MAC-AMAC used | Analytics Service |
| LMF Location | for authentication and | MDT Minimization of |
| Management Function | key agreement (TSG T | Drive Tests |
| LOS Line of | WG3 context) | ME Mobile Equipment |
| Sight | MAC-IMAC used for data | MeNB master eNB |
| LPLMN Local | integrity of | MER Message Error |
| PLMN | signalling messages (TSG | Ratio |
| MIB Master Information | T WG3 context) | MGL Measurement Gap |
| Block, Management | MPUSCH MTC | Length |
| Information Base | Physical Uplink Shared | MGRP Measurement Gap |
| MIMO Multiple Input | Channel | Repetition Period |
| Multiple Output | MPLS MultiProtocol | MWUS MTC wake- |
| MLC Mobile Location | Label Switching | up signal, MTC |
| Centre | MS Mobile Station | WUS |
| MM Mobility | MSB Most Significant | NACK Negative |
| Management | Bit | Acknowledgement |
| MME Mobility | MSC Mobile Switching | NAI Network Access |
| Management Entity | Centre | Identifier |
| MN Master Node | MSI Minimum System | NAS Non-Access |
| MNO Mobile | Information, MCH | Stratum, Non- Access |
| Network Operator | Scheduling | Stratum layer |
| MO Measurement | Information | NCT Network |
| Object, Mobile | MSID Mobile Station | Connectivity Topology |
| Originated | Identifier | NC-JT Non- |
| MPBCH MTC | MSIN Mobile Station | coherent Joint |
| Physical Broadcast | Identification | Transmission |
| CHannel | Number | NEC Network Capability |
| MPDCCH MTC | MSISDN Mobile | Exposure |
| Physical Downlink | Subscriber ISDN | NE-DC NR-E- |
| Control CHannel | Number | UTRA Dual |
| MPDSCH MTC | MT Mobile Terminated, | Connectivity |
| Physical Downlink | Mobile Termination | NEF Network Exposure |
| Shared CHannel | MTC Machine-Type | Function |
| MPRACH MTC | Communications | NF Network Function |
| Physical Random | mMTCmassive MTC, | NFP Network |
| Access CHannel | massive Machine- | Forwarding Path |
| NFVO NFV Orchestrator | Type Communications | NFPD Network |
| NG Next Generation, | MU-MIMO Multi User | Forwarding Path |
| Next Gen | MIMO | Descriptor |
| NGEN-DC NG-RAN | Synchronization | NFV Network Functions |
| E-UTRA-NR Dual | Signal | Virtualization |
| Connectivity | NSSS Narrowband | NFVI NFV Infrastructure |
| NM Network Manager | Secondary | O&M Operation and |
| NMS Network | Synchronization | Maintenance |
| Management System | Signal | ODU2 Optical channel |
| N-PoP Network Point of | NR New Radio, | Data Unit - type 2 |
| Presence | Neighbour Relation | OFDM Orthogonal |
| NMIB, N-MIB | NRF NF Repository | Frequency Division |
| Narrowband MIB | Function | Multiplexing |
| NPBCH Narrowband | NRS Narrowband | OFDMA Orthogonal |

| | | |
|---|---|---|
| Physical Broadcast CHannel | Reference Signal NS Network Service | Frequency Division Multiple Access |
| NPDCCH Narrowband Physical Downlink Control CHannel | NSA Non-Standalone operation mode NSD Network Service Descriptor | OOB Out-of-band OOS Out of Sync OPEX OPerating EXpense OSI Other System |
| NPDSCH Narrowband Physical Downlink Shared CHannel | NSR Network Service Record | Information OSS Operations Support |
| NPRACH Narrowband Physical Random Access CHannel | NSSAINetwork Slice Selection Assistance Information | System OTA over-the-air PAPR Peak-to-Average |
| NPUSCH Narrowband Physical Uplink Shared CHannel | S-NNSAI Single-NSSAI NSSF Network Slice Selection Function | Power Ratio PAR Peak to Average Ratio PBCH Physical Broadcast |
| NPSS Narrowband Primary PCell Primary Cell PCI Physical Cell ID, Physical Cell Identity | NW Network NWUS Narrowband wake-up signal, Narrowband WUS NZP Non-Zero Power | Channel PC Power Control, Personal Computer PCC Primary Component Carrier, |
| PCEF Policy and Charging Enforcement Function | PEI Permanent Equipment Identifiers PFD Packet Flow Description | Primary CC P-CSCF Proxy CSCF PRB Physical resource |
| PCF Policy Control Function PCRF Policy Control and ChargingRules Function | P-GW PDN Gateway PHICH Physical hybrid-ARQ indicator channel PHY Physical layer | block PRG Physical resource block group ProSe Proximity Services, Proximity-Based |
| PDCP Packet Data Convergence Protocol, Packet Data Convergence Protocol layer | PLMN Public Land Mobile Network PIN Personal Identification Number PM Performance | Service PRS Positioning Reference Signal PRR Packet Reception Radio |
| PDCCH Physical Downlink Control Channel | Measurement PMI Precoding Matrix Indicator | PS Packet Services PSBCH Physical Sidelink Broadcast |
| PDCP Packet Data Convergence Protocol PDN Packet Data Network, Public Data Network | PNF Physical Network Function PNFD Physical Network Function Descriptor PNFR Physical Network | Channel PSDCH Physical Sidelink Downlink Channel PSCCH Physical |
| PDSCH Physical Downlink Shared Channel | Function Record POC PTT over Cellular PP, PTP Point-to- | Sidelink Control Channel PSSCH Physical |
| PDU Protocol Data Unit PT-RS Phase-tracking reference signal PTT Push-to-Talk | Point PPP Point-to-Point Protocol PRACH Physical | Sidelink Shared Channel PSCell Primary SCell PSS Primary |
| PUCCH Physical Uplink Control Channel | RACH RADIUS Remote Authentication Dial In | Synchronization Signal PSTN Public Switched Telephone Network |
| PUSCH Physical Uplink Shared Channel | User Service RAN Radio Access Network | RLC AM RLC Acknowledged Mode |
| QAM Quadrature Amplitude Modulation QCI QoS class of identifier | RAND RANDom number (used for authentication) RAR Random Access | RLC UM RLC Unacknowledged Mode RLF Radio Link Failure RLM Radio Link |
| QCL Quasi co-location QFI QoS Flow ID, QoS Flow Identifier | Response RAT Radio Access Technology | Monitoring RLM-RS Reference Signal for RLM |
| QoS Quality of Service QPSK Quadrature (Quaternary) Phase Shift Keying | RAU Routing Area Update RB Resource block, Radio Bearer | RM Registration Management RMC Reference Measurement Channel |
| QZSS Quasi-Zenith Satellite System RA-RNTI Random Access RNTI | RBG Resource block group REG Resource Element Group | RMSI Remaining MSI, Remaining Minimum System Information RN Relay Node |
| RAB Radio Access Bearer, Random Access Burst | Rel Release REQ REQuest RF Radio Frequency | RNC Radio Network Controller RNL Radio Network |
| RACH Random Access Channel RSRP Reference Signal Received Power | RI Rank Indicator RIV Resource indicator value RL Radio Link | Layer RNTI Radio Network Temporary Identifier ROHC RObust Header |
| RSRQ Reference Signal Received Quality | RLC Radio Link Control, Radio Link | Compression RRC Radio Resource |

-continued

RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-CSCF serving CSCF
S-GW Serving Gateway
S-RNTI SRNC Radio Network Temporary Identity
S-TMSI SAE Temporary Mobile Station Identifier
SA Standalone operation mode
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
Control layer
SAE System Architecture Evolution
SAP Service Access Point
SAPD Service Access Point Descriptor
SAPI Service Access Point Identifier
SCC Secondary Component Carrier, Secondary CC
SCell Secondary Cell
SCEF Service Capability Exposure Function
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SR Scheduling Request
SRB Signalling Radio Bearer
SRS Sounding Reference Signal
SS Synchronization Signal
SSB Synchronization Signal Block
SSID Service Set Identifier
SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control
Control, Radio Resource Control layer
RRM Radio Resource Management
RS Reference Signal
SDL Supplementary Downlink
SDNF Structured Data Storage Network Function
SDP Session Description Protocol
SDSF Structured Data Storage Function
SDT Small Data Transmission
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAI Tracking Area Identity
TAU Tracking Area Update
TB Transport Block
TBS Transport Block Size
TBD To Be Defined
TCI Transmission Configuration Indicator
UML Unified Modelling Language
UMTS Universal Mobile Telecommunications System
UP User Plane
UPF User Plane Function
URI Uniform Resource Identifier
URL Uniform Resource Locator -continued

| | | |
|---|---|---|
| TPMI Transmitted Precoding Matrix Indicator | Information UE User Equipment UDM Unified Data | URLLC Ultra-Reliable and Low Latency |
| TR Technical Report | Management | USB Universal Serial |
| TRP, TRxP Transmission Reception Point | UDP User Datagram Protocol UDSF Unstructured Data | Bus USIM Universal Subscriber Identity Module |
| TRS Tracking Reference Signal | Storage Network Function | USS UE-specific search space |
| TRx Transceiver V2P Vehicle-to-Pedestrian | UICC Universal Integrated Circuit Card UL Uplink | UTRA UMTS Terrestrial Radio Access UTRAN Universal |
| V2V Vehicle-to-Vehicle V2X Vehicle-to-everything | UM Unacknowledged Mode WiMAX Worldwide | Terrestrial Radio Access Network UwPTS Uplink Pilot |
| VIM Virtualized Infrastructure Manager | Interoperability for Microwave Access | Time Slot V2I Vehicle-to- |
| VL Virtual Link, VLAN Virtual LAN, Virtual Local Area Network | WLANWireless Local Area Network WMAN Wireless Metropolitan Area | Infrastruction |
| VM Virtual Machine VNF Virtualized Network Function | Network WPANWireless Personal Area Network | |
| VNFFG VNF Forwarding Graph | X2-C X2-Control plane X2-U X2-User plane | |
| VNFFGD VNF Forwarding Graph Descriptor | XML extensible Markup Language XRES EXpected user | |
| VNFM VNF Manager VoIP Voice-over-IP, Voice-over- Internet Protocol | RESponse XOR exclusive OR ZC Zadoff-Chu ZP Zero Power | |
| VPLMN Visited Public Land Mobile Network | | |
| VPN Virtual Private Network | | |
| VRB Virtual Resource Block | | |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory) shared, dedicated, or group(, an Application Specific Integrated Circuit) ASIC(, a field-programmable device) FPD( ) e.g., a field-programmable gate array) FPGA (, a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision)CV(and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) configure the UE to:
   receive an uplink (UL)/downlink (DL) configuration that includes a non-overlapping sub-band full duplex (NOSB-FD) symbol, wherein the NOSB-FD symbol includes a first frequency resource for UL communication and a second frequency resource for DL communication;
   receive a downlink control information (DCI) or a higher-layer configuration for transmission of a UL signal or reception of a DL signal in the NOSB-FD symbol, wherein the DCI or the higher-layer configuration indicates a frequency resource allocation that overlaps with the first and second frequency resources;
identify a set of frequency resources for the UL signal or DL signal based on the DCI or the higher-layer configuration and the UL/DL configuration; and
receive the DL signal or transmit the UL signal in the identified set of frequency resources.

2. The one or more NTCRM of claim 1, wherein the frequency resource allocation indicated by the DCI or the higher-layer configuration is with reference to a sub-band determined by the UL/DL configuration or with reference to an active bandwidth part (BWP).

3. The one or more NTCRM of claim 2, wherein the identified set of frequency resources corresponds to the frequency resource allocation indicated by the DCI or the higher-layer configuration.

4. The one or more NTCRM of claim 2, wherein, for the DL transmission, the identified set of frequency resources excludes a portion of the frequency resource allocation that overlaps with the first frequency resource; and wherein, for the UL transmission, the identified set of frequency resources excludes a portion of the frequency resource allocation that overlaps with the second frequency resource.

5. The one or more NTCRM of claim 4, wherein the UL signal or DL signal is entirely canceled, rate matched around the excluded portion, or mapped to physical resources but not transmitted in the excluded portion.

6. One or more non-transitory computer-readable media (NTCRM) having instructions, stored thereon, that when executed by one or more processors of a next generation Node B (gNB), configure the gNB to:
transmit, to a user equipment (UE), an uplink (UL)/downlink (DL) configuration that includes a non-overlapping sub-band full duplex (NOSB-FD) symbol, wherein the NOSB-FD symbol includes a first frequency resource for UL and a second frequency resource for DL;
transmit, to the UE, a downlink control information (DCI) or a higher-layer configuration for transmission of a UL signal or reception of a DL signal in the NOSB-FD symbol, wherein the DCI or the higher-layer configuration indicates a frequency resource allocation that overlaps with the first and second frequency resources;
identify a set of frequency resources for the UL signal or DL signal based on the DCI or the higher-layer configuration and the UL/DL configuration; and
receive the UL signal or transmit the DL signal in the identified set of frequency resources.

7. The one or more NTCRM of claim 6, wherein the frequency resource allocation indicated by the DCI or the higher-layer configuration is provided with reference to a sub-band determined by the UL/DL configuration or with reference to an active bandwidth part (BWP).

8. The one or more NTCRM of claim 7, wherein the identified set of frequency resources corresponds to the frequency resource allocation indicated by the DCI or the higher-layer configuration.

9. The one or more NTCRM of claim 7, wherein, for the DL signal, the identified set of frequency resources excludes a portion of the frequency resource allocation that overlaps with the first frequency resource; and wherein, for the UL signal, the identified set of frequency resources excludes a portion of the frequency resource allocation that overlaps with the second frequency resource.

10. The one or more NTCRM of claim 9, wherein the UL signal or the DL signal is entirely canceled, rate matched around the excluded portion, or mapped to physical resources but not transmitted in the excluded portion.

* * * * *